US010006551B2

(12) United States Patent
Wilfong et al.

(10) Patent No.: US 10,006,551 B2
(45) Date of Patent: Jun. 26, 2018

(54) FLUID ADDITIVE CONTROL VALVE

(71) Applicant: First Sales, LLC, Churubusco, IN (US)

(72) Inventors: Rudy B. Wilfong, Fort Wayne, IN (US); Robert D. Rohr, Huntertown, IN (US)

(73) Assignee: FIRST SALES LLC, Churubusco, IN (US)

(*) Notice: Subject to any disclaimer, the term of this patent is extended or adjusted under 35 U.S.C. 154(b) by 0 days. days.

(21) Appl. No.: 15/057,746

(22) Filed: Mar. 1, 2016

(65) Prior Publication Data
US 2016/0252185 A1 Sep. 1, 2016

Related U.S. Application Data

(62) Division of application No. 13/842,262, filed on Mar. 15, 2013, now Pat. No. 9,625,042.
(Continued)

(51) Int. Cl.
F16K 11/07 (2006.01)
F16K 25/00 (2006.01)
(Continued)

(52) U.S. Cl.
CPC ........ F16K 11/0712 (2013.01); B01F 5/0413 (2013.01); F16J 15/002 (2013.01); F16K 11/07 (2013.01); F16K 25/005 (2013.01); C02F 1/42 (2013.01); C02F 2201/005 (2013.01); F16K 11/0704 (2013.01); F16K 11/0716 (2013.01);
(Continued)

(58) Field of Classification Search
CPC ............ B01F 5/0413; C02F 2201/005; Y10T 137/8766
See application file for complete search history.

(56) References Cited

U.S. PATENT DOCUMENTS 2,017,311 A * 10/1935 Jacobson ............. G05D 7/0126
137/502
3,239,012 A * 3/1966 Bunting ................. A01B 63/10
172/9
(Continued)

FOREIGN PATENT DOCUMENTS

CA 2 347 065 5/2001
EP 0 305 252 3/1989
JP 0940090 2/1997

Primary Examiner — Terry K Cecil
(74) Attorney, Agent, or Firm — Faegre Baker Daniels LLP

(57) ABSTRACT

A valve arrangement includes various improvements useable in the context of a fluid additive system, such as a water softener. For example, the valve assembly may include a seal assembly engaged by a reciprocating piston, in which the seal assembly includes a minimal number of parts, is easily assembled, and can be easily inserted in the bore of the valve body without jeopardizing the integrity of the seals. The valve assembly may further include a quick-disconnect system which allows a "control head" including a valve actuation system and electronic controls to be disconnected from the rest of the valve arrangement with only a partial rotation of the control head. The valve assembly may also include a venturi used for drawing regeneration fluid into the system, and an associated venturi cleaner system which allows a user to unclog the fluid-flow orifice of the venturi without any disassembly of parts of the valve arrangement.

14 Claims, 20 Drawing Sheets

Related U.S. Application Data

(60) Provisional application No. 61/710,861, filed on Oct. 8, 2012.

(51) Int. Cl.
*B01F 5/04* (2006.01)
*F16J 15/00* (2006.01)
*C02F 1/42* (2006.01)

(52) U.S. Cl.
CPC .. *Y10T 137/86694* (2015.04); *Y10T 137/8737* (2015.04); *Y10T 137/8766* (2015.04)

(56) References Cited

U.S. PATENT DOCUMENTS

| | | | |
|---|---|---|---|
| 3,365,166 A * | 1/1968 | Smith | B62D 11/18 |
| | | | 251/121 |
| 4,578,226 A | 3/1986 | Adlhoch et al. | |
| 5,819,955 A | 10/1998 | Clarke | |
| 6,138,715 A | 10/2000 | LaLone et al. | |
| 6,402,944 B1 | 6/2002 | Vaughan | |

* cited by examiner

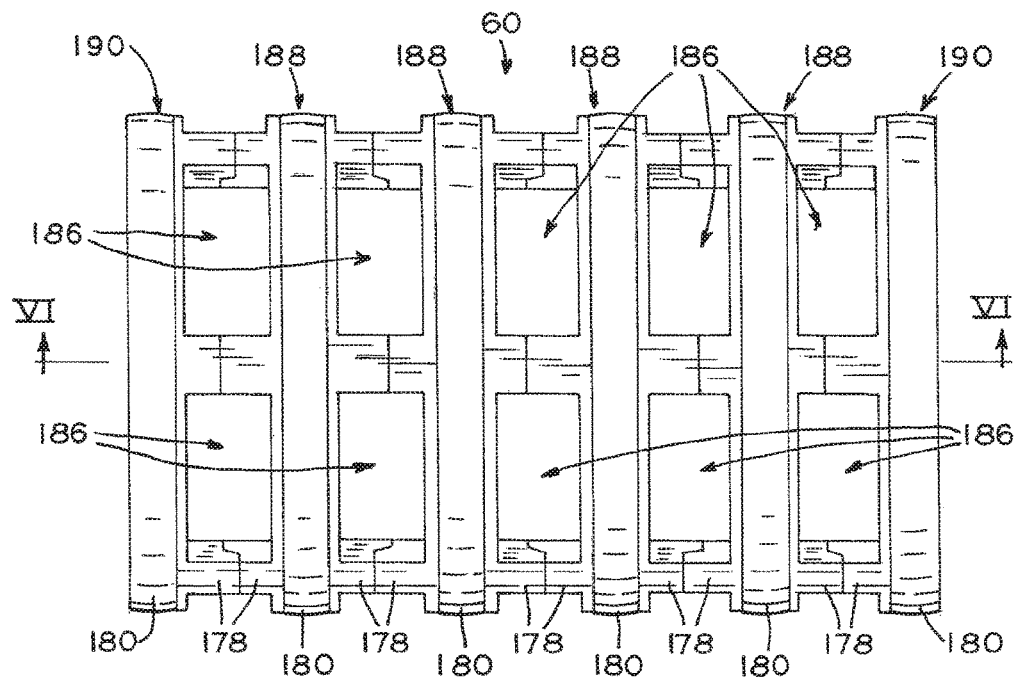
FIG_5
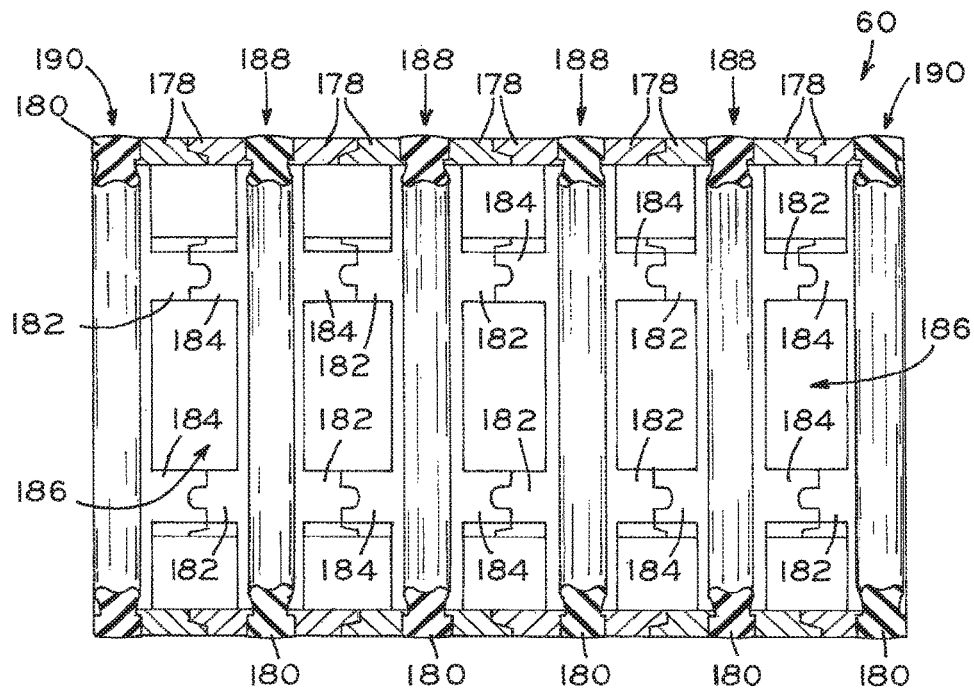
FIG_6

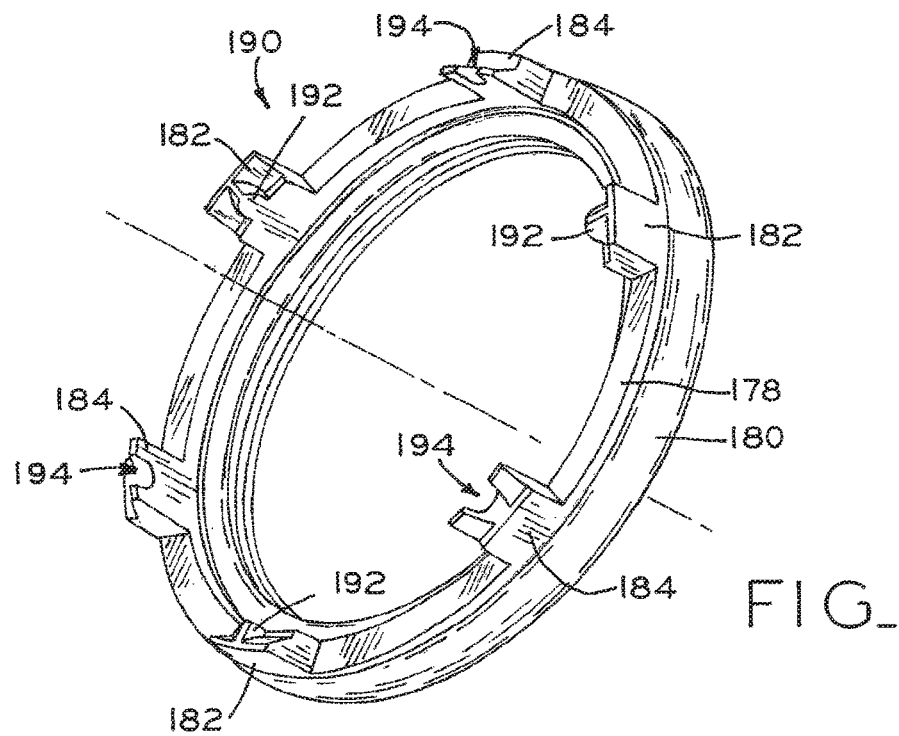
FIG_7
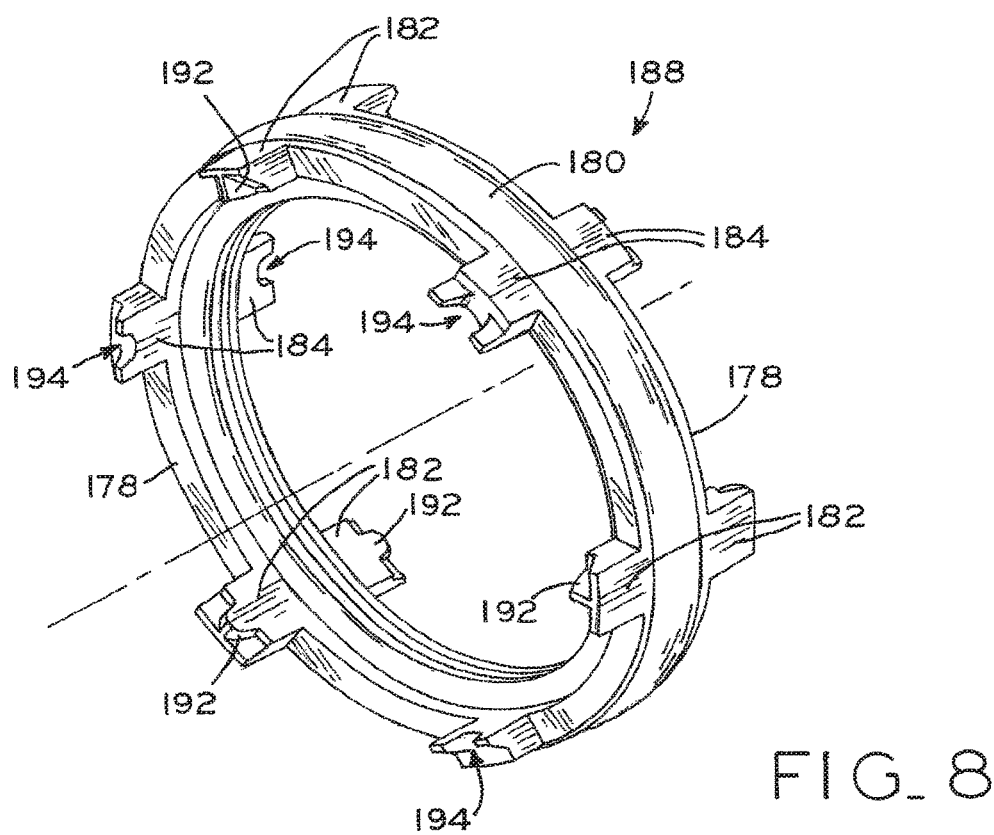
FIG_8

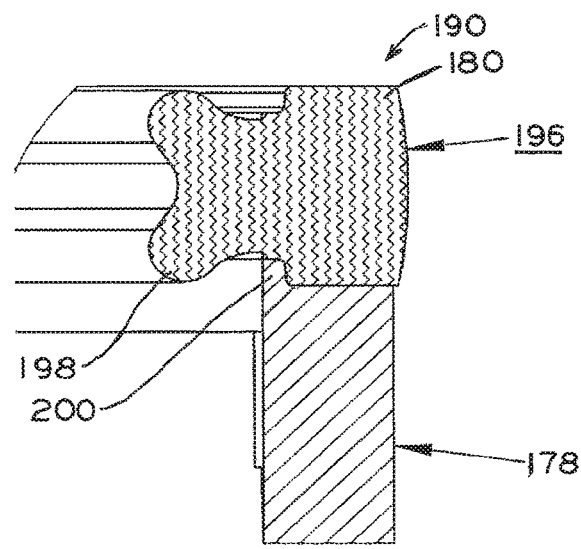
FIG_9A
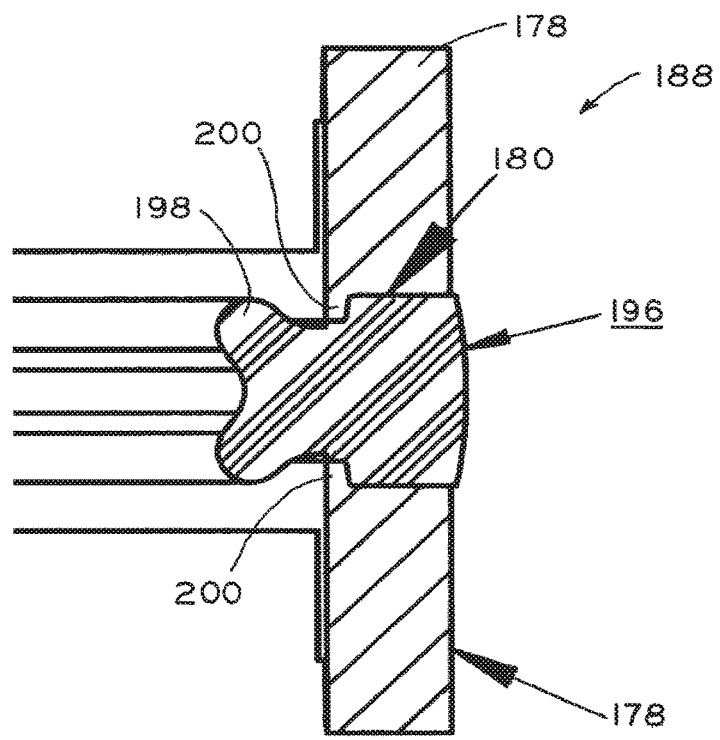
FIG_9B

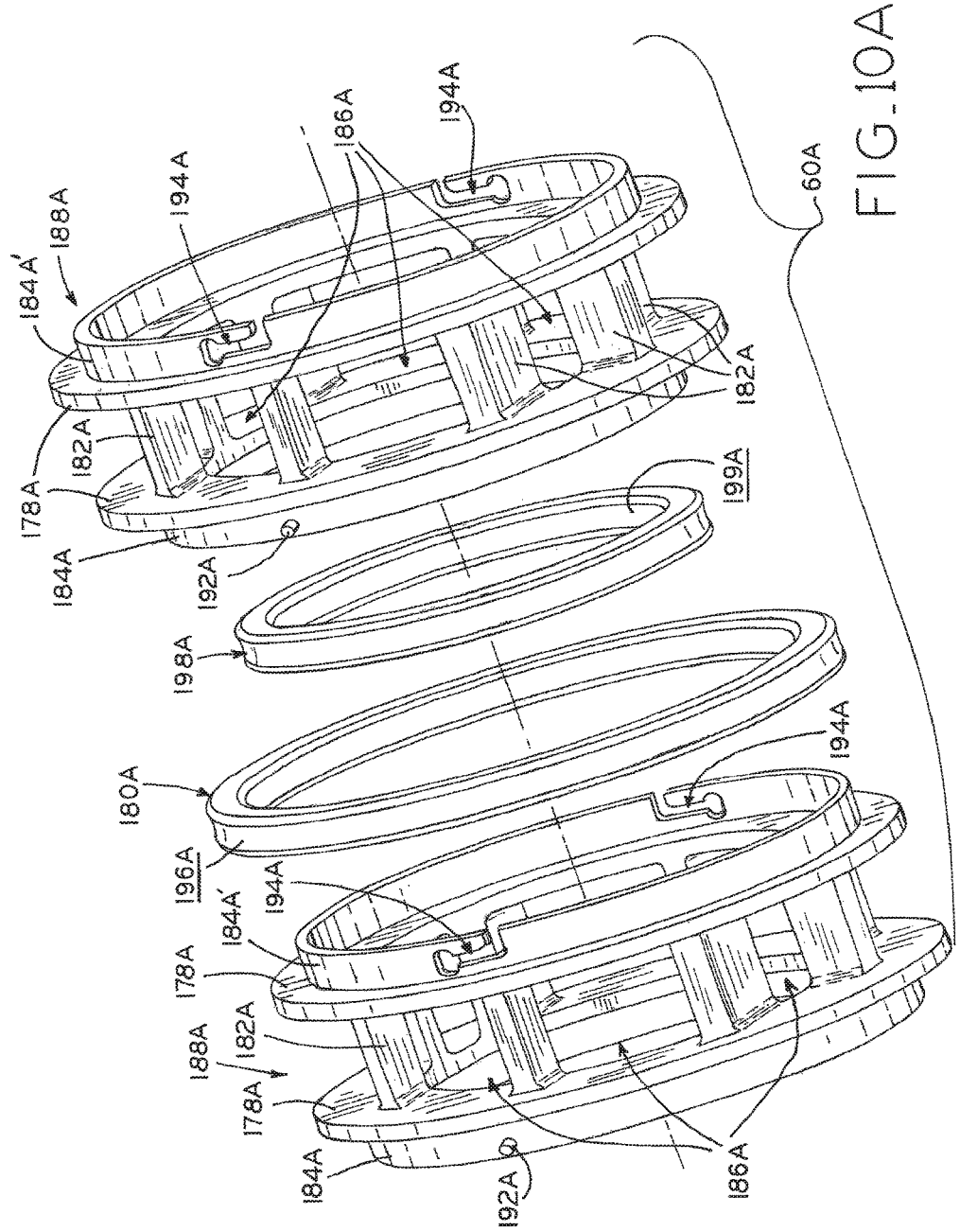

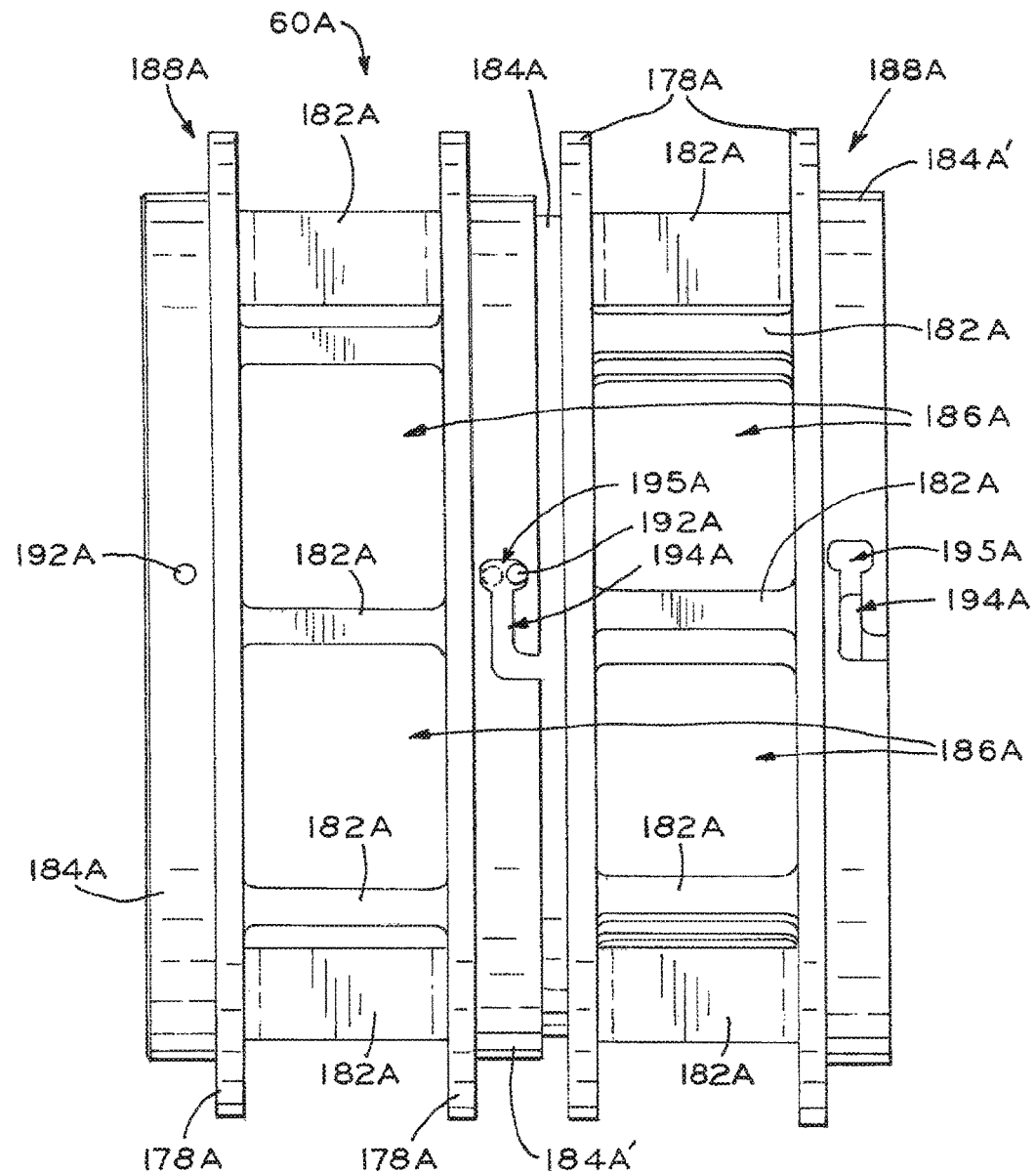
FIG_10B

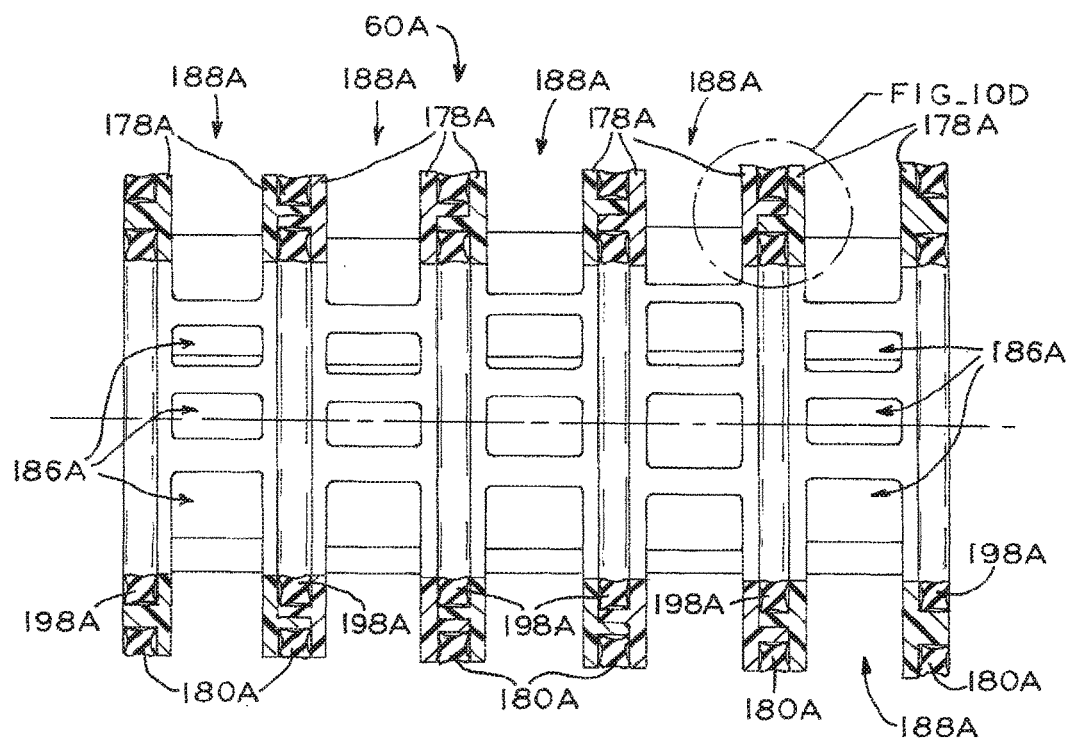
FIG_10C
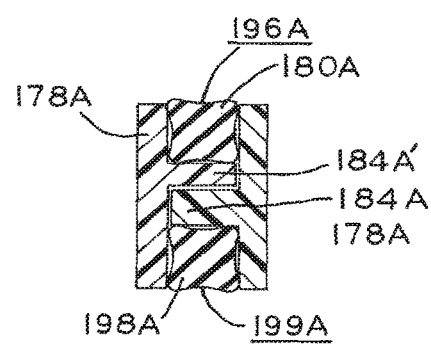
FIG_10D

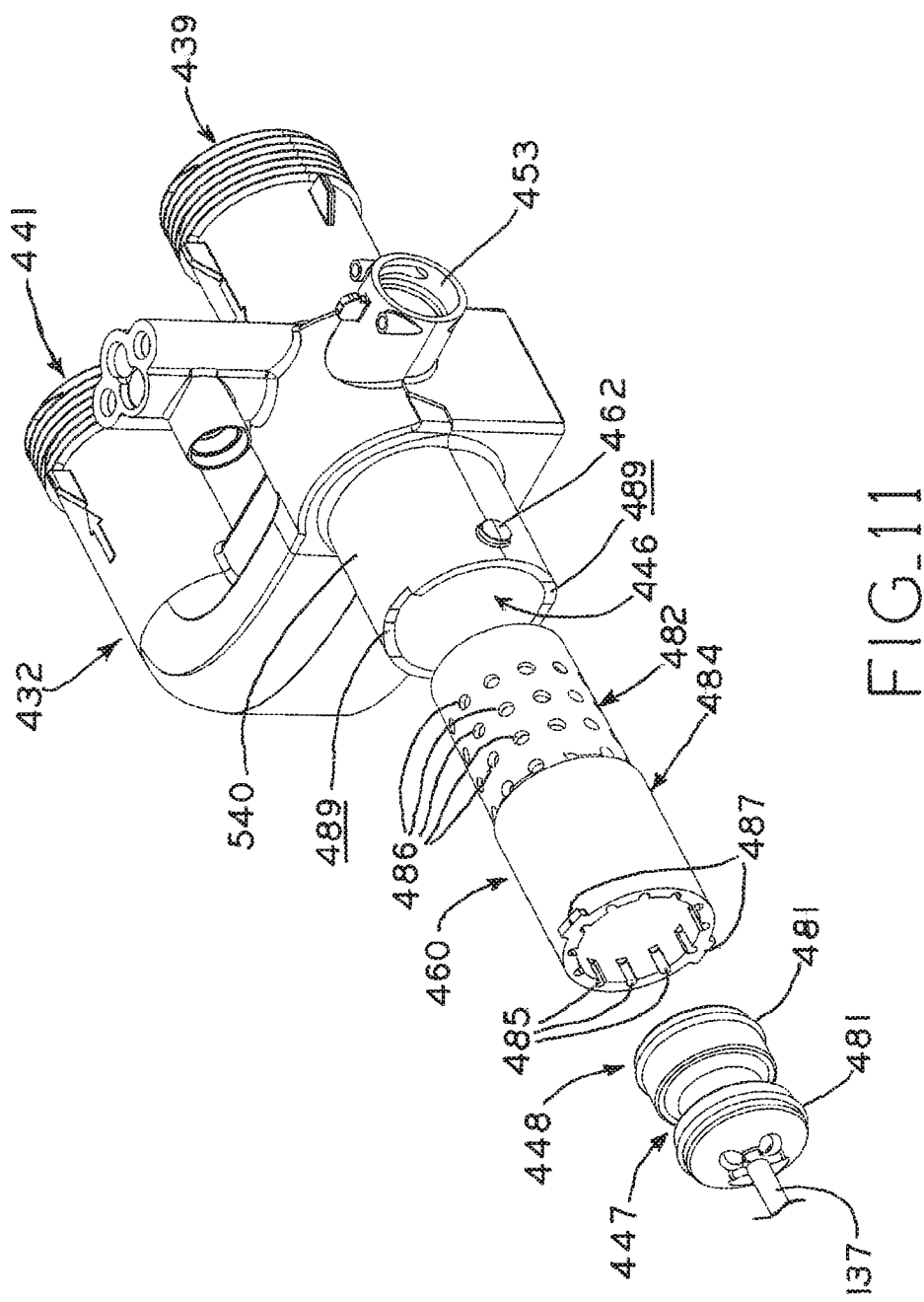
FIG_11

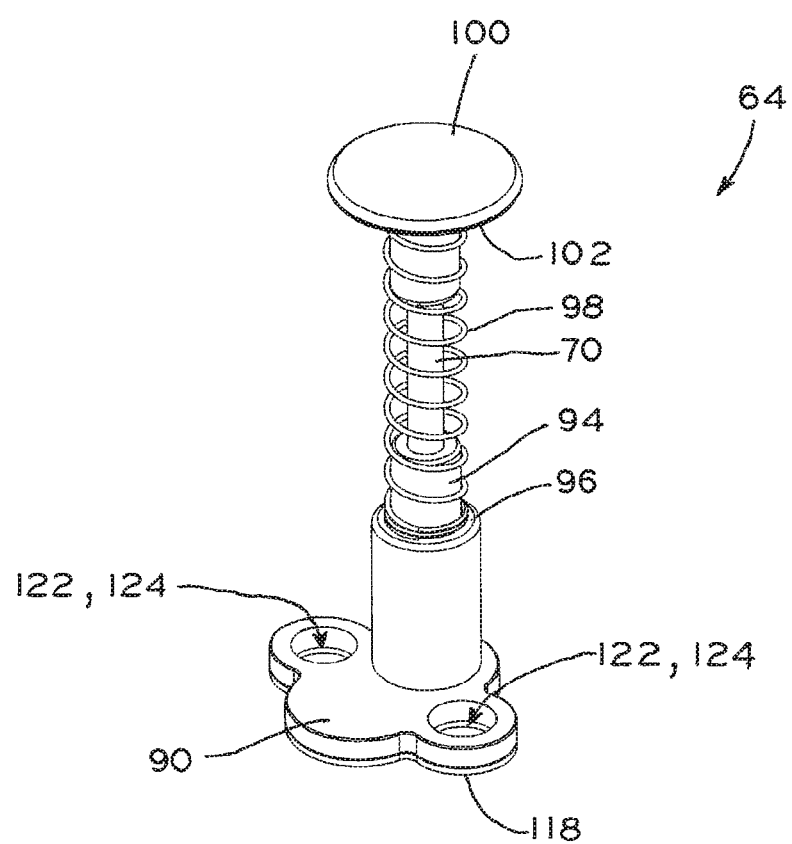
FIG_14

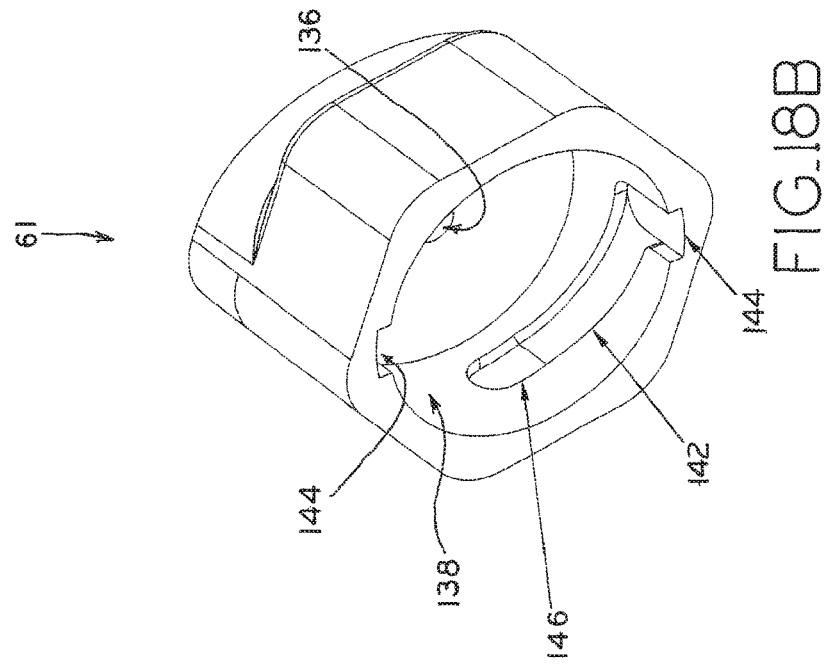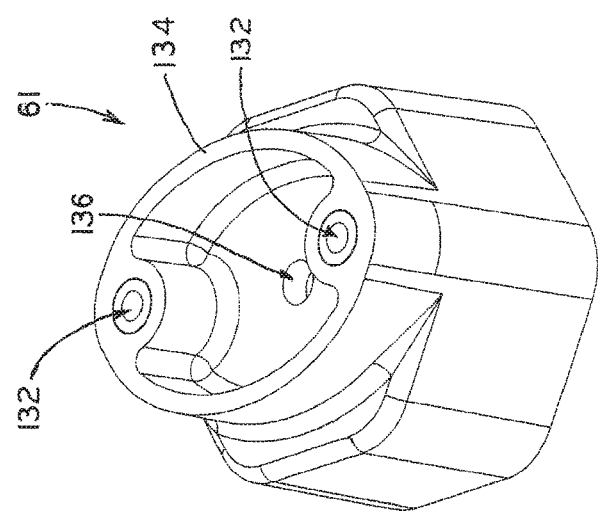

FLUID ADDITIVE CONTROL VALVE

CROSS-REFERENCE TO RELATED APPLICATIONS

This is a divisional application of U.S. patent application Ser. No. 13/842,262 filed on Mar. 15, 2013, entitled FLUID ADDITIVE CONTROL VALVE, which claims the benefit under Title 35, U.S.C. Section 119(e) of U.S. Provisional Patent Application Ser. No. 61/710,861, filed Oct. 8, 2012 and entitled WATER SOFTENER INJECTOR CLEANER, the entire disclosures of which are hereby expressly incorporated herein by reference.

BACKGROUND

1. Technical Field

The present disclosure relates to fluid control valves and, more particularly, to fluid control valve arrangements for water treatment equipment, such as ion exchange water softeners and media filters.

2. Description of the Related Art

Fluid control valves are generally used for water treatment systems, such as water softeners that remove certain minerals from the water as delivered to the end user. Such minerals (e.g., calcium, magnesium, manganese and iron) contribute to what is commonly referred to as water "hardness." Water softener systems may employ an ion exchange process to bond the minerals to other materials. Such ion exchange may be effected by providing an ion exchange resin bed containing resin materials designed to promote the ion exchange process. The resin bed is housed in a resin tank which is filled with some of the water from the water source. As this water passes across the resin bed, ions of calcium and other positively charged ions are exchanged with ions held by the resin (typically sodium). Objectionable hardness minerals are thereby removed from the water and replaced with less objectionable ions from the resin.

Ion exchange resin capacity is gradually depleted as the ion exchange process is repeated over time. Water treatment controls may be provided as part of a water softener system to periodically regenerate the resin contained in the resin tank. This regeneration can be accomplished, for example, by the reversal of the above-described softening process. That is, the objectionable ions formerly bonded to the resin during the water softening process (such as calcium) are chemically replaced with less objectionable sodium or similar ions. In some systems, this reversal is accomplished by passing a regenerant solution of sodium or potassium chloride through the resin bed.

To effect distribution of the regenerant solution, a control valve may be attached to the top of the resin tank. The control valve includes a structure for directing the flow of fluid to complete the regeneration process, such as a reciprocating piston, rotating disc or poppets. The regeneration process controlled by the control valve may include a number of steps, such as: i) a backwash cycle to remove turbidity from the resin bed; ii) a brine draw cycle to introduce the regenerant to the resin bed; iii) a rinse to eliminate chlorides in the finished water; and iv) a brine refill cycle to prepare a brine solution for the next regeneration. During the time elapse during these various cycles, the control valve may also provide an internal bypass to provide untreated water to the end user, so that water supply remains uninterrupted.

In addition to the application of a water softener as described above, a fluid control valve can be used on various water filters. Control valves used on water filter systems may, for example, be used to effect a backwash cycle to remove collected precipitated iron, or sediment from filter elements, or to replenish an oxidizer reservoir within the filter system with material for oxidation (e.g., potassium permanganate, chlorine or air).

Reciprocating piston type water treatment control valves generally have a seal arrangement contained within a cylindrical bore and surrounding a piston. In these types of arrangements, a motor may drive the piston axially to selectively connect particular inlet and outlet ports, thereby cycling the valve through various positions involved in the regeneration process. The piston moves to connect ports in various combinations, as the respective seals provide a water tight barrier between ports. The seal arrangement may be separate individual seals arranged next to one another, or they may be joined together.

Seal arrangements usable with a water treatment control valve may be pre-compressed stacks. In some cases, this type of pre-compressed seal stack has the various individual seals and associated spacers therebetween welded or screwed together.

U.S. Pat. No. 6,402,944 ("the '944 patent") describes a seal assembly that can be preassembled prior to insertion in the valve bore. Unlike the seal designs including pre-compressed stacks of seal components, the seals of the '944 patent includes various seals that are not compressed until the assembly is fully inserted.

The resin bed of water treatment systems is often made up of a reservoir of salt. In order to prevent depletion of the salt reserves, some devices indirectly monitor the salt level in the salt storage reservoir by using an electronic controller to calculates how much salt from the reservoir has been used based on the number of regenerations that have occurred and the amount of salt programmed to be used per regeneration. When the controller determines that the reservoir's salt reserves should be depleted, an operator may be alerted to refill the reservoir and then manually reset the salt-level monitor to once again begin counting the number of regeneration cycles completed. Such manual resetting may be accomplished, for example, by pushing a reset button when salt is added or placing a float on top of the salt each time the salt is replenished.

Another previous idea is a paddle located in the salt tank that is pushed when in contact with salt. If salt level drops below the paddle a circuit is completed and a user is notified of the low level. In some cases, however, salt may engage the paddle at such an angle as to jam the paddle and prevent actuation.

Yet another monitoring methodology measures the conductivity of the brine solution and indicates the need for salt replenishment when the conductivity drops by a certain amount. In these systems, the monitor must be submerged in the corrosive brine solution. Indication of a low salt level (and therefore, of the need to replenish the salt reserves) will occur only after substantially all of the salt is consumed.

SUMMARY

The present disclosure provides valve arrangement including various improvements useable in the context of a fluid additive system, such as a water softener. For example, the valve assembly may include a seal assembly engaged by a reciprocating piston, in which the seal assembly includes a minimal number of parts, is easily assembled, and can be easily inserted in the bore of the valve body without jeopardizing the integrity of the seals. The valve assembly may further include a quick-disconnect system which allows a "control head" including a valve actuation system and electronic controls to be disconnected from the rest of the valve arrangement with only a partial rotation of the control head. The valve assembly may also include a venturi used for drawing regeneration fluid into the system, and an associated venturi cleaner system which allows a user to unclog the fluid-flow orifice of the venturi without any disassembly of parts of the valve arrangement.

Further, the valve assembly may include a regenerant substrate monitor which performs reliably to provide notice to the user of a low-substrate condition in the regenerant substrate reservoir. Finally, the valve assembly may include a speaker system connected to a control which operates to announce assembly and/or maintenance instructions to the user upon demand.

In one form thereof, the present disclosure provides a seal assembly for use in a multi-port valve, the seal assembly comprising: a first seal subassembly structure including a first pair of flanges separated by a first plurality of stanchions, the first seal subassembly structure having a first shoulder extending axially away from the one of the first pair of flanges and a second shoulder extending axially away from the other of the first pair of flanges; an outer seal mounted to one of the first shoulder and the second shoulder, the outer seal having an outer seal surface disposed radially outwardly of the first pair of flanges; a second seal subassembly structure including a second pair of flanges separated by a second plurality of stanchions, the second seal subassembly structure having a third shoulder extending axially away from the one of the second pair of flanges and a fourth shoulder extending axially away from the other of the second pair of flanges; and an inner seal mounted to one of the third shoulder and the fourth shoulder, the inner seal extending radially inwardly of the second pair of flanges, one of the first and second shoulders axially fixed to one of the third and fourth shoulders such that the first seal subassembly structure is axially fixed to the second seal subassembly structure, the outer seal axially captured between one of the first pair of flanges and one of the second pair of flanges, and the inner seal axially captured between one of the first pair of flanges and one of the second pair of flanges.

In another form thereof, the present disclosure provides a seal assembly for use in a multi-port valve, the seal assembly comprising: a first seal subassembly including a first seal and a first spacer affixed to an axial end of the first seal, the first spacer including a first plurality of protrusions arranged around a periphery of the first spacer and extending axially away from the first seal; and a second seal subassembly including a second seal and a second spacer affixed to an axial end of the second seal, the second spacer including a second plurality of the protrusions arranged around a periphery of the second spacer and extending axially away from the first seal, the first and second pluralities of protrusions extending toward one another and interfitted with the one another to affixed to the first spacer to the second spacer such that a plurality of flow apertures are formed between respective neighboring pairs of the interfitted spacers, whereby the first seal and the second seal are disposed on opposing sides of the plurality of flow apertures.

In yet another form thereof, the present disclosure provides a seal for use in a conical valve bore, the seal comprising: a body made of a monolithically formed single piece of conically shaped material, the body having respective sets of flow apertures formed therein and spaced axially from one another; a plurality of outer sealing surfaces disposed on an outer surface of the body between respective sets of the flow apertures, such that each neighboring pair of the outer sealing surfaces flanks each set of the flow apertures, the plurality of outer sealing surfaces having progressively larger outside diameters; a plurality of inner sealing surfaces disposed on an inner surface of the body, such that a neighboring pair of the inner sealing surfaces flanks each set of flow apertures, the plurality of inner sealing surfaces having a common diameter adapted to engage a substantially cylindrical piston.

In yet another form thereof, the present disclosure provides a valve arrangement comprising: a venturi valve having a nozzle portion and a throat having a constricted flow area with respect to the nozzle portion; and a venturi cleaner assembly comprising: a base including a mounting surface adapted to mount to the valve arrangement; and a plunger received in the base, the venturi cleaner assembly mounted in axial alignment with the venturi valve, the plunger including a deblocking tip that is axially moveable to selectively protrude past the mounting surface and into the throat of the venturi valve.

In still another form thereof, the present disclosure provides a water treatment system comprising: a valve arrangement including a valve housing, the valve housing comprising: a fluid inlet; a fluid outlet in fluid communication with the fluid inlet; a valve bore tube including a valve bore disposed between the fluid inlet and the fluid outlet, the valve bore including at least one valve port adapted to redirect fluid flowing from the fluid inlet into contact with a water treatment substrate and then to the fluid outlet; and one of a groove and a protrusion formed on the valve bore tube, a substrate reservoir in fluid communication with the at least one valve port, the substrate reservoir containing the water treatment substrate; a control head selectively affixable to the valve arrangement such that the control head comprises an assembled configuration and a disassembled configuration, the control head comprising: a back plate having a coupler attached thereto; a piston extending outwardly from the back plate, the piston sized to be received within the valve bore and axially moveable within the valve bore when the control head is in the assembled configuration; an piston actuator operably connected to the piston such that the piston actuator selectively axially moves the piston within the valve bore to selectively allow or restrict fluid flow from the fluid inlet to the at least one valve port when the control head is in the assembled configuration; and the other of the groove and the protrusion formed on the coupler, the protrusion is receivable within the groove and rotatable through an arcuate path of the groove to affix the control head to the valve arrangement by less than one 360-degree turn of the control head relative to the valve arrangement.

In yet another form thereof, the present disclosure provides a water treatment system comprising: a valve arrangement including a valve housing, the valve housing comprising: a fluid inlet; a fluid outlet in fluid communication with the fluid inlet; a valve bore tube including a valve bore disposed between the fluid inlet and the fluid outlet, the valve bore including at least one valve port adapted to redirect fluid flowing from the fluid inlet into contact with a water treatment substrate and then to the fluid outlet; a control head mounted to the valve arrangement, the control head including a controller and at least one valve receivable within the valve bore; a substrate reservoir in fluid communication with the at least one valve port, the substrate reservoir containing the water treatment substrate; and an audio instruction system mounted to the control head, the audio instruction system comprising: a speaker mounted to the control head and in operable communication with the controller; a plurality of control buttons connected to the controller, the buttons operable to play back and control audio instructions stored on the controller through the speaker.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 5 is a side elevation view of a seal arrangement assembly made in accordance with the present disclosure;

FIG. 6 is a side elevation, cross-section view of the seal arrangement of FIG. 5, taken along line VI-VI;

FIG. 7 is a perspective view of an end seal section of the seal arrangement of FIG. 5;

FIG. 8 is a perspective view of a middle seal section of the seal arrangement of FIG. 5;

FIG. 9A is an enlarged elevation view of a portion of the seal arrangement shown in FIG. 6, illustrating a cross-sectional shape of an end seal section;

FIG. 9B is an enlarged elevation view of a portion of the seal arrangement shown in FIG. 6, illustrating a cross-sectional shape of an intermediate seal section;

FIG. 10A is a perspective, exploded view of another seal arrangement made in accordance with the present disclosure;

FIG. 10B is a side elevation view of the seal arrangement shown in FIG. 10A, after assembly thereof;

FIG. 10C is a side elevation, cross-section view of the seal arrangement shown in FIG. 10A, after assembly thereof;

FIG. 10D is an enlarged elevation view of a portion of the seal arrangement shown in FIG. 10C;

FIG. 11 is an exploded, perspective view of an alternative valve arrangement using a tapered seal;

FIG. 14 is a perspective view of a venturi cleaner assembly made in accordance with the present disclosure;

FIG. 18A is a perspective view of a quick-disconnect connection element made in accordance with the present disclosure;

FIG. 18B is another perspective view of a quick-disconnect connection element made in accordance with the present disclosure;

Figure 1:
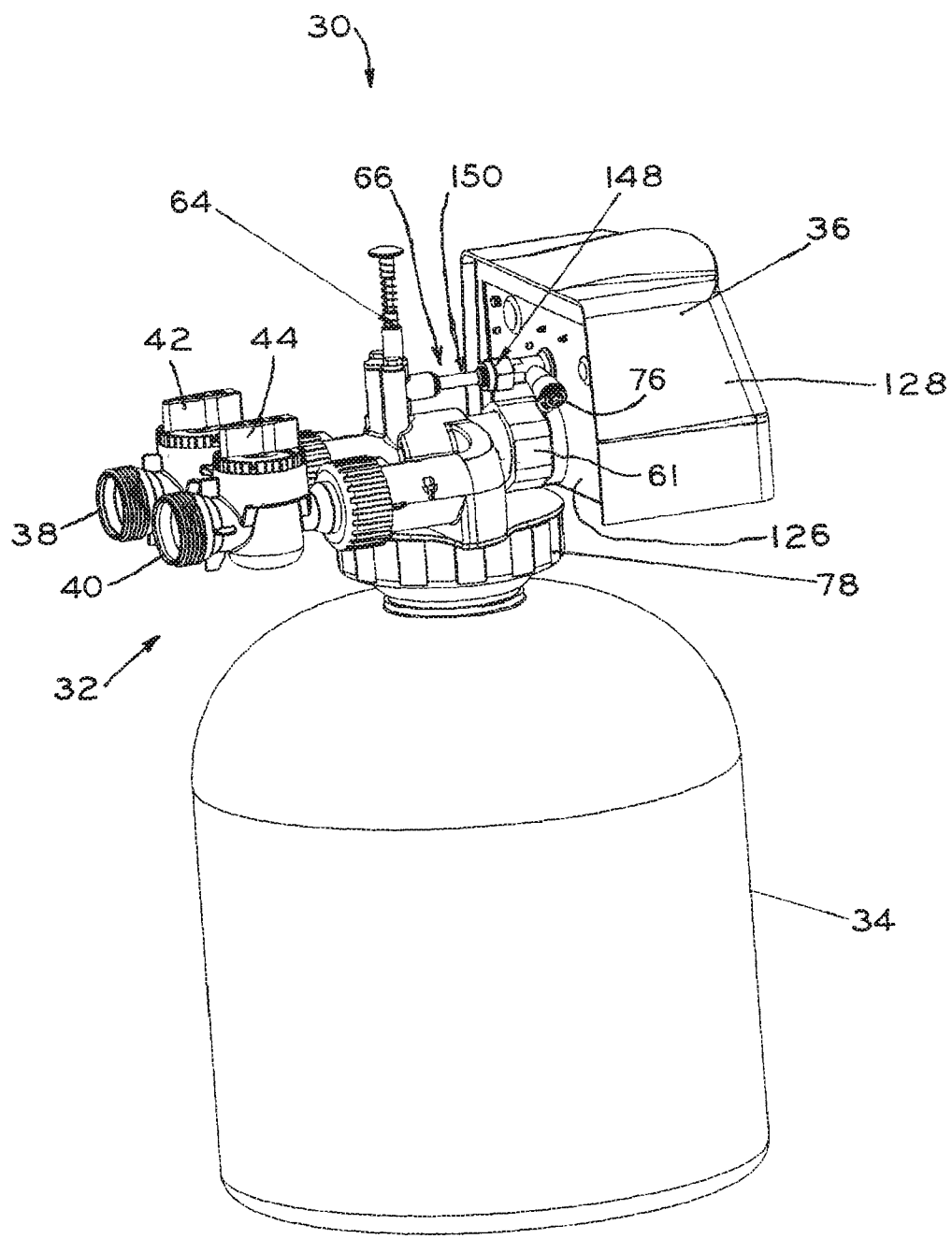
FIG. 1 is a perspective view of a valve arrangement made in accordance with the present disclosure.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION OF THE PRESENT INVENTION

The following embodiments of the present invention are chosen and described so that others skilled in the art may utilize their teachings. While the present disclosure is directed to a valve arrangement and other associated structures for a water softener system, it will be understood that the system may have applications to other scenarios and in other contexts. For example, in one alternative implementation, the systems and methods disclosed herein may be utilized to provide a valve arrangement for a fluid filter, such as a home or industrial water filter. Moreover, while the exemplary embodiment described below provides a valve arrangement for controlling the functions of a water softener, it is contemplated that the valve arrangement may be applied in any system where the throughput flow of fluid is selectively treated with a substrate material from a storage tank, and in which such substrate material is periodically recharged from an external source.

Turning to FIG. 1, water softener system 30 includes valve arrangement 32 in fluid communication with substrate reservoir 34 and operably connected to control head 36. Water softener system 30 is designed to alter the chemical composition of incoming water by an ion exchange process, though it is also contemplated that similar systems may be used for media filters such as carbon filters, iron filters, sediment filters, and filters used to remove hydrogen sulfide gas. In the illustrated system, valve arrangement 32 includes fluid inlet 38 which receives a flow of fluid to be treated, and fluid outlet 40 which discharges a flow of treated fluid after such fluid has been operated upon as described in further detail below.

Figure 2:
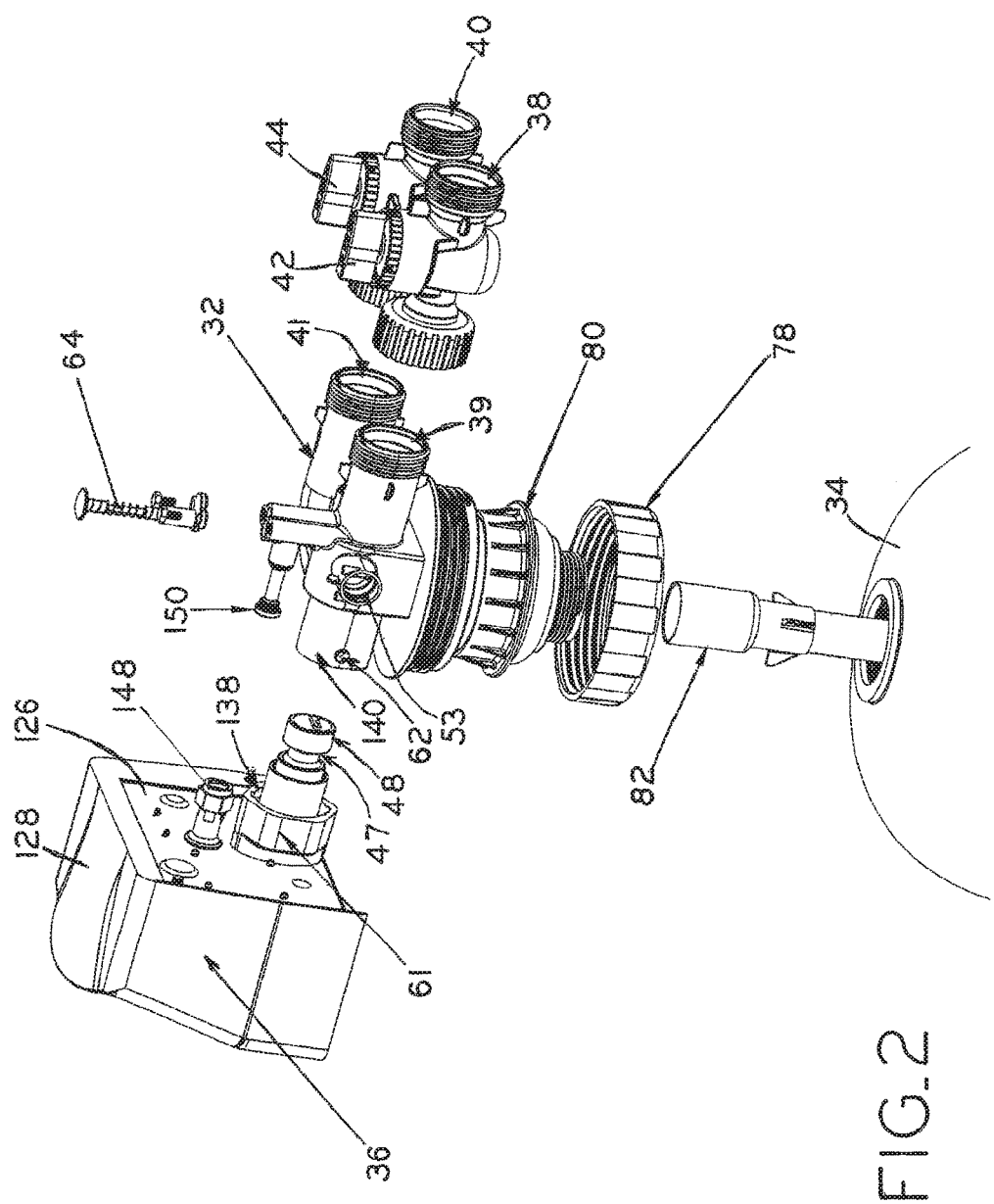
FIG. 2 is an exploded, perspective view of the valve arrangement shown in FIG. 1.
Figure 4:
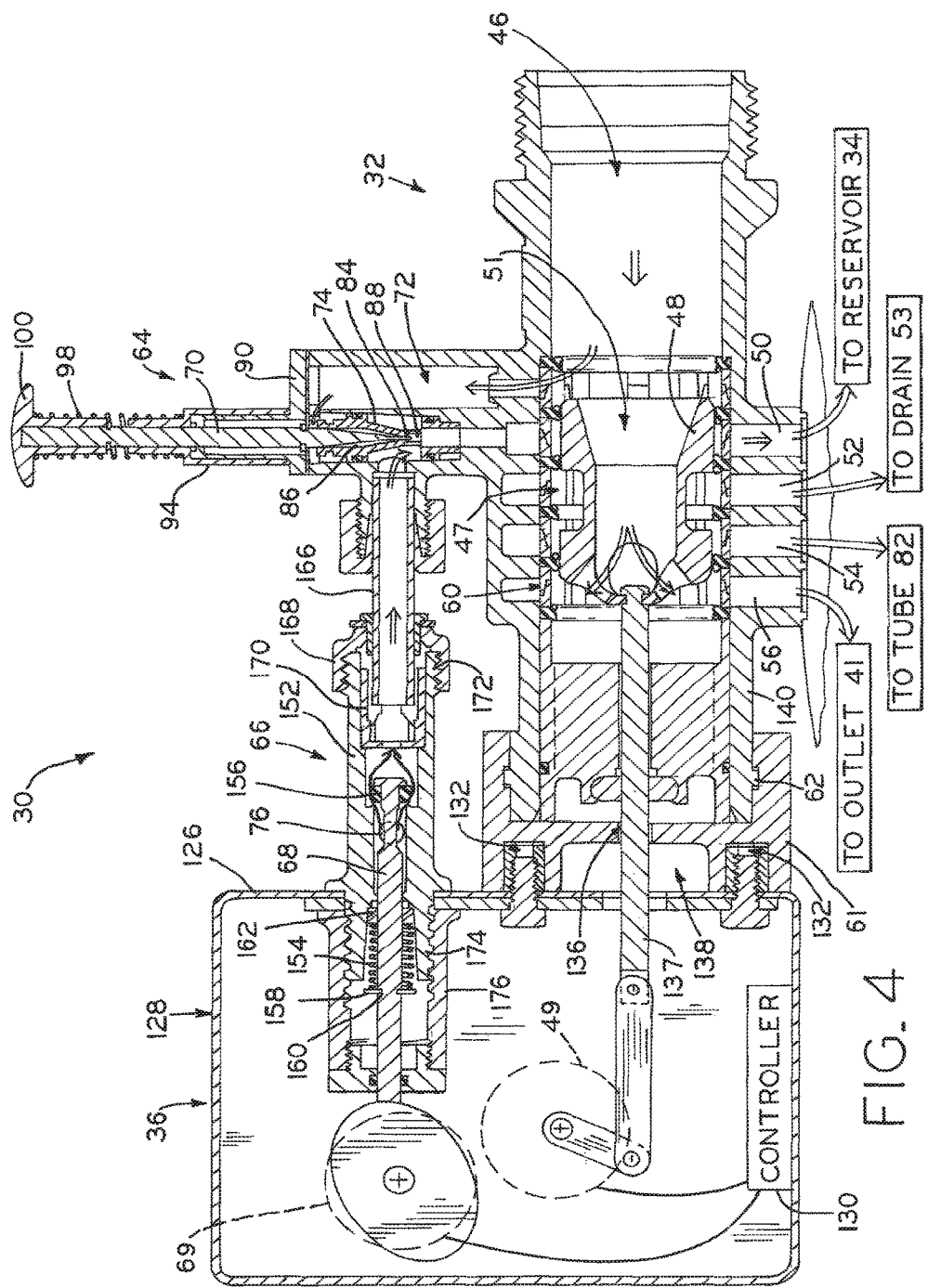
FIG. 4 is an elevation, cross-section view of the valve arrangement shown in FIG. 3, taken along the line IV-IV.

Optionally, inlet 38 and outlet 40 may include shutoff valves 42, 44, respectively, which selectively permit or prevent the flow of fluid into and out of valve arrangement 32. In the illustrated embodiment, shutoff valves 42, 44 are attached as separate components to secondary inlet 39 and secondary outlet 41, respectively (FIG. 2). Fluid is received at inlet 38 and flows through valve 42, through secondary inlet 39 and into valve bore 46 (FIG. 4). Depending on the position of valve piston 48 disposed within bore 46 (FIG. 2), annular recess 47 formed in piston 48 aligns with one of the annular flow paths defined by ports 50, 52, 54, 56 (FIG. 4) within valve bore 46 to allow fluid to flow therethrough. Depending on which of ports 50, 52, 54, 56 fluid is allowed to flow through, one of four fluid flow states is enabled: brine charge, water softening (i.e., normal operation), brine regeneration, backwash or rinse, all described in further detail below.

As described in further detail below, a seal assembly 60 is disposed between piston 48 and the adjacent wall of valve bore 46 to selectively seal ports 50, 52, 54, 56 from one another depending on the position of piston 48. Piston 48 is driven by an actuator contained within control head 36, such as motor 49 which operates arm 49A to axially advance or retract piston 48 into or out of valve bore 46. In an exemplary embodiment, such advancement and retraction of piston 48 is controlled according to various inputs into controller 130 also contained within control head 36, which may receive signals from other parts of the system or the user. Control head 36 is attached to valve arrangement 32 by quick disconnect coupler 61, which engages protrusion 62 formed on valve arrangement 32 as described in further detail below.

All incoming fluid received into valve bore 46 via inlet 38 passes through venturi cleaner assembly 64, which in turn creates a vacuum pressure operable to selectively draw brine solution from an external reservoir into the fluid flow pathway via brine valve assembly 66. Brine valve assembly 66 is selectively actuated to permit or prevent a flow of brine solution therethrough by actuation of valve stem 68, which is axially advanced or retracted by motor 69 or another suitable linear actuator contained within control head 36. As described in detail below, venturi cleaner assembly 64 includes venturi plunger 70, which may be used to clear any blockages from minerals buildup or other solid material within the flow restriction orifice created by the venturi valve 74.

During the brine regeneration cycle, piston 48 moves from the position of FIG. 4, in which annular recess 47 is aligned with ports 52 and 54, axially downstream to align recess 47 with ports 54 and 56. Accordingly, fluid flows from inlet 38, then upwardly into venturi feeder passage 72 and through venturi valve 74. During regeneration, valve stem 68 is actuated to allow brine solution to be drawn from a remote brine source (not shown) through brine inlet 76, through brine valve assembly 66 and into the fluid stream flowing just downstream of venturi valve 74. The mixed fluid then flows downstream through the annular chamber accessed by port 50 around piston 48 and into substrate reservoir 34 via coupling 78. As illustrated in FIG. 2, coupling 78 operates to attach adapter 80 to valve arrangement 32, while coupling 78 is in turn threadably received at the top of substrate reservoir 34. Tube assembly 82 is provided to direct a flow of softened water from the bottom of reservoir 34 into port 54, and then into annular recess 47 of piston 48 which is aligned with port 54 (FIG. 4). Annular recess 47 is also aligned with port 56, which is fluidly connected to outlet 40 and therefore allows the fluid flowing through annular recess 47 to discharge to outlet 40.

During the brine charge cycle, fluid flows as shown in FIG. 4. More particularly, fluid flows from inlet 38 through central passageway 51 of piston 48, then into discharge port 56 and on to outlet 40, thereby bypassing the water softening functionality of system 30 but providing constant water service to the end user. Meanwhile, some of the water flowing from inlet 38 is diverted through venturi valve 74, as described above with respect to the regeneration cycle, and flows through port 50, around piston 48, and into reservoir 34 via coupling 78. As this fluid is driven downwardly into reservoir 34, fluid is forced upwardly through tube assembly 82, into port 54, and into annular recess 47 of piston 48. Annular recess 47 of piston 48 is aligned with both ports 54 and 52, such that the fluid in recess 47 flows outwardly into port 52 and is then discharged at drain 53 (FIG. 2). Thus, in the brine charge cycle, brine is drawn through brine valve assembly 66 into reservoir 34, while any existing fluid in reservoir 34 is discharged. Untreated water passes from inlet 38 to outlet 40 during this process.

During the water softening (i.e., regular service) cycle, piston 48 moves from the position of FIG. 4, in which annular recess 47 is aligned with ports 52 and 54, axially downstream to align recess 47 with ports 54 and 56 (i.e., the same position as the brine regeneration cycle discussed above). Accordingly, fluid flows from inlet 38, down into reservoir 34 via port 50 (which is unblocked by any portion of piston 48, and back upwardly through tube 82. Because annular recess 47 of piston 48 is aligned with both of ports 54 and 56, fluid flows from tube 82 to into annular recess 47 via port 54 and then to outlet 40 via port 56. Thus, the water softening arrangement of water softener 30 is the same as the regeneration cycle described above, except that in the water softening position brine valve assembly 66 is closed so that brine is not drawn into reservoir 34 by the vacuum created by venturi valve 74.

During the backwash cycle, piston 48 moves from the position of FIG. 4, in which annular recess 47 is aligned with ports 52 and 54, axially upstream to align recess 47 with ports 50 and 52. Accordingly, central passageway 51 is in fluid communication with both of ports 54 and 56. Fluid flowing from inlet 38 passes through central passageway 51 and downwardly into reservoir 34 via tube 82 through port 54 (FIG. 4), rather than via coupling 78 as noted above in certain other cycles. Fluid also flows outwardly through port 56 to provide untreated fluid to outlet 40. The fluid in reservoir 34 is forced upwardly out through coupling 78, which forces fluid into port 50 and annular recess 47. This fluid is discharged at drain 53 (FIG. 2) via port 52. Thus, in this cycle fluid is passed through reservoir 34 in the reverse order that it normally passes, which affords an opportunity to dislodge foreign materials lodged within the substrate contained at the bottom of reservoir 34.

During the rinse cycle, annular recess 47 of piston 48 is aligned with ports 52 and 54, as shown in FIG. 4, while brine valve assembly 66 is in the closed position. Water flows from inlet 38 downwardly into reservoir via port 50 and coupler 78, then back upwardly from reservoir 34 through tube 82 and into annular recess 47 via port 54. Water is discharged from recess 47 through port 52, leading outwardly to drain 53 (FIG. 2). Meanwhile, water is also allowed to flow from inlet 38 to outlet 40 via central passageway 51 and port 56. Thus, this mode allows incoming untreated water to pass through reservoir 34 and directly to drain 53.

The operation and flexibility of water softener system 30 is enhanced and facilitated by various system improvements described in turn below, including the structure and arrangement of seal assembly 60, the use of venturi cleaner assembly 64, and the connection and disconnection of control head 36 from valve arrangement 32 using quick release coupling 61. Water softener system 30 may also optionally include a regenerant substrate monitor and audio instruction system.

1. Seal Assembly

Referring now to FIG. 5, seal assembly 60 includes a series of spacers 178 which operate to space apart elastomeric seals 180 such that each neighboring pair of seals 180 are separated by a predefined distance. In the gap between such neighboring pairs of seals 180, spacers 178 each include a plurality of protrusions 182, 184 which interfit with one another to interlock adjacent pairs of spacers 178 together, as described in further detail below. When so interlocked, flow apertures 186 are formed between respective neighboring pairs of interfitted protrusions and are sized and oriented to allow fluid flow through one of the internal valve ports 50, 52, 54, 56. Thus, when seal assembly 60 is received within valve bore 46 as shown in FIG. 4, seals 180 are each sealingly interfitted with a portion of the wall of valve bore 46 between a neighboring pair of valve ports 50, 52, 54, 56, while a set of flow apertures 186 between each neighboring pair of seals 180 align with the valve port 50, 52, 54 or 56 between such pair of seals 180. When piston 48 is aligned with one of valve ports 50, 52, 54, 56, fluid is allowed to flow through apertures 186 and around annular recess 47. Therefore all other ports 50, 52, 54, 56, seals 180 provide a fluid-tight barrier so the fluid can only travel through the port 50, 52, 54 or 56 not closed off by the piston. To change the active port 50, 52, 54 or 56, piston 48 axially slides within bore 46 formed by seal 60 to realign annular recess 47 with the desired port 50, 52, 54 or 56.

As noted above, seal assembly 60 facilitates insertion into and removal from valve bore 46 by being provided as a single, unitary unit. In the embodiment of FIGS. 5 and 6, this unitary seal assembly is made by attaching one or more mid-section subassemblies 188 to one another, and to end section subassemblies 190. In the exemplary embodiment illustrated, end section subassembly 190 includes a single spacer 178 having outer protrusions 182 and inner protrusions 184 extending axially outwardly (i.e., away from seal 180) at regular, alternating locations around the periphery of spacer 178. In the illustrated exemplary embodiment, six total protrusions 182, 184 are provided (three each of protrusions 182 and 184, alternating with one another as shown). Spacer 178 is affixed to seal 180 by any suitable method, such as a mechanical pinching of the material of seal 180 by spacer 178, an adhesive bond joining seal 180 and spacer 178, or an over molding of seal 180 upon spacer 178. One method of over-molding spacers 178 to seals 180 is to first mold spacers 178 out of a plastic material capable of withstanding very high temperatures, such as polyphthalamide. Seals 180 can then be molded directly onto spacers 178 without losing the structural shape and rigidity of spacers 178.

Similarly, mid-section subassembly 188 includes two spacers 178 flanking each axial end of seal 180. To connect mid-section subassembly 188 with end-section subassembly 190, respective outer protrusions 182 on one of subassemblies 188, 190 are aligned with inner protrusions 184 on the other of subassemblies 188, 190. The aligned protrusions 182, 184 are then interfitted with one another to affix mid-section subassembly 188 to end section subassembly 190. This affixation may be accomplished by adhesives, a solvent weld, a sonic weld or a heat weld, or by snap-fit structures. In the illustrated embodiment, for example, bulb 192 (FIGS. 7 and 8) formed on each outer protrusion 182 may have an expanding outer profile that lockingly interfits with a correspondingly contracting inner profile of recess 194 formed in each inner protrusion 184. Spacers 178 are fixed to seal 180 by one or more of the methods described above with respect to end section subassembly 190.

Attachment of two adjacent mid-section subassemblies 188 is accomplished in the same manner, such that any number of mid-section subassemblies 188 can be modularly attached to one another to create seal assembly 60 having as many seals 180 and corresponding sets of flow apertures 186 as desired, with end section subassemblies 190 interfitted at each axial end of seal assembly 60. In the illustrated embodiment of FIGS. 5 and 6, four mid-section subassemblies 188 are interposed between two end section subassemblies 190 to create five sets of flow apertures 186 useable with a set of five flow chambers in a valve body. By contrast, the embodiment of FIG. 4 shows three mid-section subassemblies 188 interposed between two end section subassemblies 190 to create four sets of flow apertures 186 for ports 50, 52, 54, 56.

Turning to FIGS. 9A and 9B, a profile of seal 180 itself is shown with respect to end and mid-section subassemblies 190, 188 respectively. As illustrated, seal 180 includes a convex radial outer surface 196 which stands proud of the adjacent radial outer surface(s) of spacer(s) 178. This allows outer surface 196 to sealingly engage the inner surface of valve bore 46. Inner seal portion 198 is a dual-lobe arrangement protruding radially inwardly to position inner seal portion 198 to contact the outer surface of piston 48 as shown in FIG. 4.

Seal assembly 60 can be axially stretched to reduce the diameter of seals 180 before it is inserted in the bore of the control valve, then compressed after insertion to increase the diameter of seals 180 and provide a firm fluid-tight seal. Stretching is accomplished by pulling end section subassemblies 190 away from one another, thereby urging all spacers 178 away from one another. This, in turn, creates an axial pull force upon seals 180 which draws outer surface 196 inwardly slightly, thereby allowing seal assembly 60 to pass into valve bore 46 and over ports 50, 52, 54, 56 with little or no interference.

Compressing is accomplished by axially advancing end section subassemblies 190 toward one another. The profile of spacers 178, at the location where seal 180 attaches to spacer 178, primarily engages the axial end surfaces of seals 180 and thereby "squeezes" seal 180 and forces outer surface 196 to expand outward. Ridges 200 create a lesser contact area with inner seal portion 198, such that the "squeezing" action created by compression of spacers 178 toward one another creates a lesser inward expansion of seal portion 198 compared to the greater outward expansion of outer surface 196. Once seal assembly 60 is in placed in valve bore 46, it can be compressed by exerting pressure on the stack of seals 180 and spacers 178. This pressure expands seals 180 both outward and inward, with the outward expansion providing a seal against bore 46 and inward providing a sealing contact with piston 48. For removal after installation (e.g., for service or replacement), seal assembly 60 is decompressed by pulling on end section subassembly 190, facilitating removal of the stack of seals 180 and spacers 178 with minimal resistance. This is because outer surface 196 of seals 180 are serially and sequentially contracted and allowed to break loose of the inner surface of valve bore 46, as each successive mid-section subassembly 188 receives a pull force after the adjacent seal 180 is pulled.

Turning now to FIGS. 10A-10D, an exploded view of an alternative seal assembly 60A is shown. Seal 60A is similar to seal 60 shown in FIGS. 5 and 6 and described above, and structures of seal 60A have corresponding reference numerals to seal 60, except with an "A" appended thereto. However, seal 60A has an alternative structural arrangement which allows seal 60A to be securely assembled from constituent parts without adhesives (though adhesives may be used, as described further below).

Referring now to FIG. 10A, seal assembly 60A includes a plurality of subassembly structures 188A having outer seal 180A and inner seal 198A received thereupon as described in further detail below. Each subassembly structure 188A includes a pair of flanges 178A axially spaced from one another and interconnected via a plurality of stanchions 182A. Flow apertures 186A are defined between neighboring pairs of stanchions 182A, are formed for a flow of fluid therethrough, in similar fashion to flow apertures 186 described in detail above. Extending axially outwardly from one of flanges 178A is shoulder 184A, which includes at least one (or, as illustrated, 2) protrusion 192A extending radially outwardly therefrom. Extending in an opposite direction, that is, axially outwardly from the other flange 178A, is shoulder 184A' including track 194A. In an exemplary embodiment, flanges 178A, stanchions 182A, and shoulders 184A, 184A' are monolithically formed as a single part, such as by injection molding. In a further exemplary embodiment, subassembly structures 188A are identical such that any number of structures 188A can be used to create subassembly 60A (see, e.g., FIGS. 10B and 10C).

Interconnection between a respective pair of subassembly structures 188A is shown in FIG. 10B. As illustrated, shoulder 184A has a relatively smaller outer diameter as compared to shoulder 184A', such that shoulder 184A may be axially received within shoulder 184A'. Track 194A of shoulder 184A' extends initially axially inwardly into the material of shoulder 184A', and then turns to extend circumferentially around a portion of shoulder 184A', terminating in expanded end aperture 195A. Upon assembly, protrusion 192A is received within track 194A as subassembly structures 188A are axially advanced one another. After protrusion 192A reaches the end of the axial portion of track 194A, subassembly structures 188A are twisted to advance protrusion 192A through the circumferentially extending portion of track 194A and into expanded end aperture 195A, as shown in FIG. 10B.

Expanded end aperture 195A allows protrusion 192A to move into one of two seated positions, shown in solid and dashed lines, respectively, in FIG. 10B. If the neighboring pair of subassembly structures 188A are urged axially apart from one another, protrusion 192A moves into the solid-line seated position shown in FIG. 10B. Conversely, if subassembly structures 188A are pushed together, protrusion 192A moves into the dashed-line seated position. When in either seated position, a twisting or rotational motion between the joined subassembly structures 188A is prevented because protrusion is no longer aligned with the circumferentially extending portion of track 194A.

FIG. 10C illustrates a larger seal assembly 60A including a plurality of subassembly structures 188A and associated outer and inner seals 180A, 198A, mounted thereto. As best seen in FIG. 10C, outer seals 180A are received upon shoulder 184A' and axially captured between respective flanges 178A when subassembly structures 188A are connected as described above. Similarly, inner seals 198A are axially captured between flanges 178A and are received upon (e.g., radially abut) shoulder 184A. Seals 180A and 198A are sized to extend radially outwardly past the radial extent of flanges 178A, such that outer surface 196A is proud of the adjacent surfaces of flanges 178A. Similarly, inner seal surface 199A extends radially inwardly past the adjacent surfaces of flanges 178A.

In an exemplary embodiment, seals 180A and 198A share a common axial space (i.e., seal 180A is directly radially outward of seal 198A as best seen in FIG. 10D), and have an axial extent sufficient to resiliently deform and urge flanges 178A apart from one another when respective neighboring pairs of subassembly structures 188A are assembled as shown in FIG. 10B. Therefore, one or both of seals 180A and 198A urge protrusion 192A into the illustrated solid-line seated position shown in FIG. 10B, within expanded end aperture 195A of track 194A. Thus, providing seals 180A and 198A between neighboring pairs of subassembly structures 188A serves to maintain the structures 188A in a locked condition during service of seal 60A.

It is contemplated that seal 60A may be used in valve bore 46 of valve arrangement 32, in the same manner as seal 60 as described in detail above. Alternatively, seal 60A may have a tapered outer profile for use in a tapered valve bore 446 of valve arrangement 432, similar to the tapered seal arrangements shown in FIGS. 11-13B and further described below.

Advantageously, seal assemblies 60, 60A include a minimal number of individual parts and can be rapidly assembled from its constituent subassemblies 188 and 190 or 188A.

Figure 12:
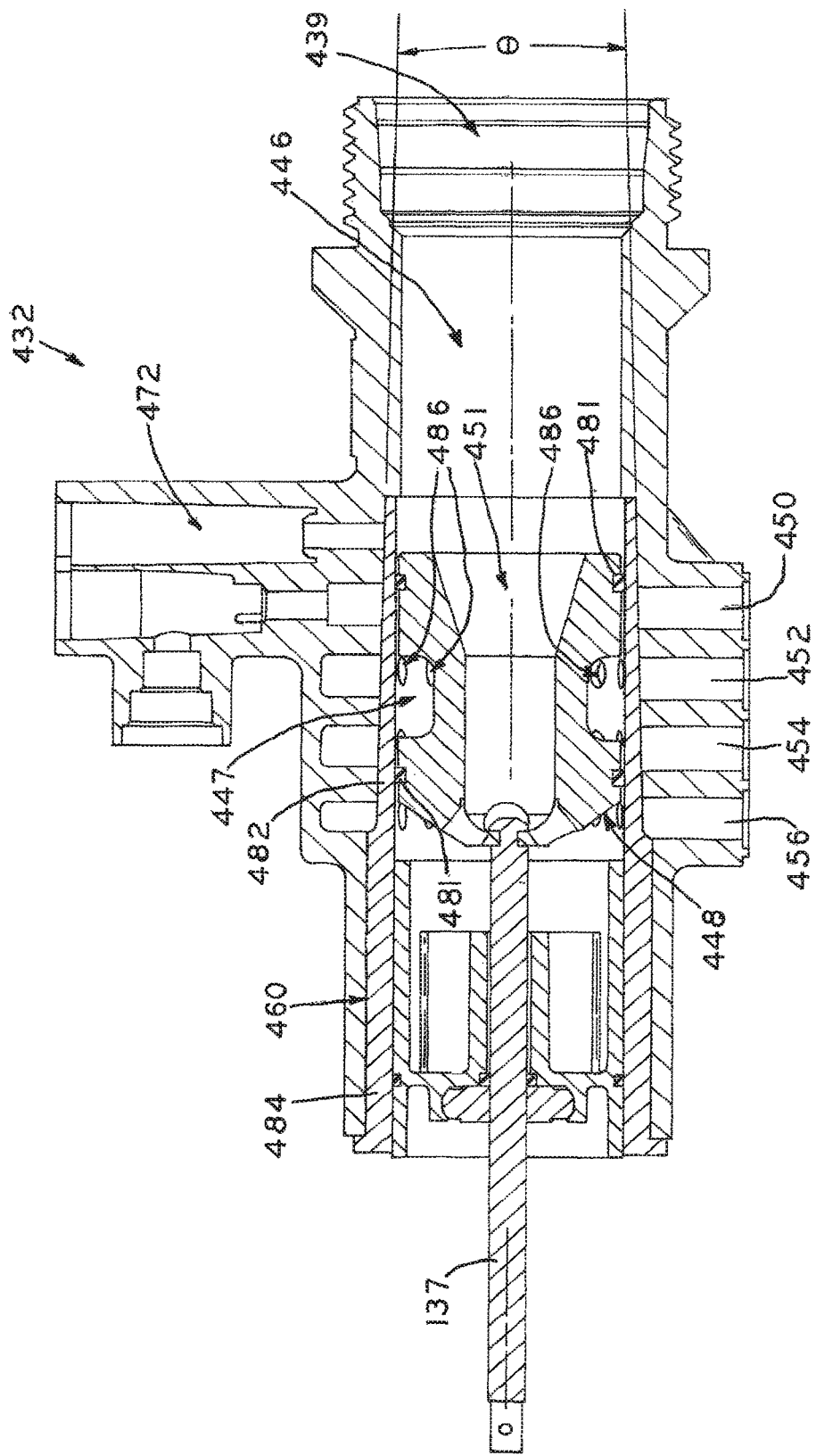
FIG. 12 is a side elevation, cross-section view of the valve arrangement shown in FIG. 11.

Turning now to FIGS. 11 and 12, an alternative seal 460 is shown as an exploded view together with alternative valve arrangement 432. Seal 460 is similar to seal 60 shown in FIGS. 5 and 6 and described above, and structures of seal 460 have corresponding reference numerals to seal 60, except with 400 added thereto. However, seal 460 is a conically-shaped structure, which may be monolithically formed as a single part, and whose outside diameter grows progressively larger from one end to the other. Valve arrangement 432 has a correspondingly frusto-conical valve bore 446, as shown in FIG. 12, which interfits with seal 460 to provide a fluid-tight seal between valve ports 450, 452, 454, 456, as further described below. In addition, piston 448 may be provided with external seals 481 received in correspondingly formed grooves flanking either axial end of annular recess 447, rather than providing inner seal portions 198 of seals.

Figure 3:
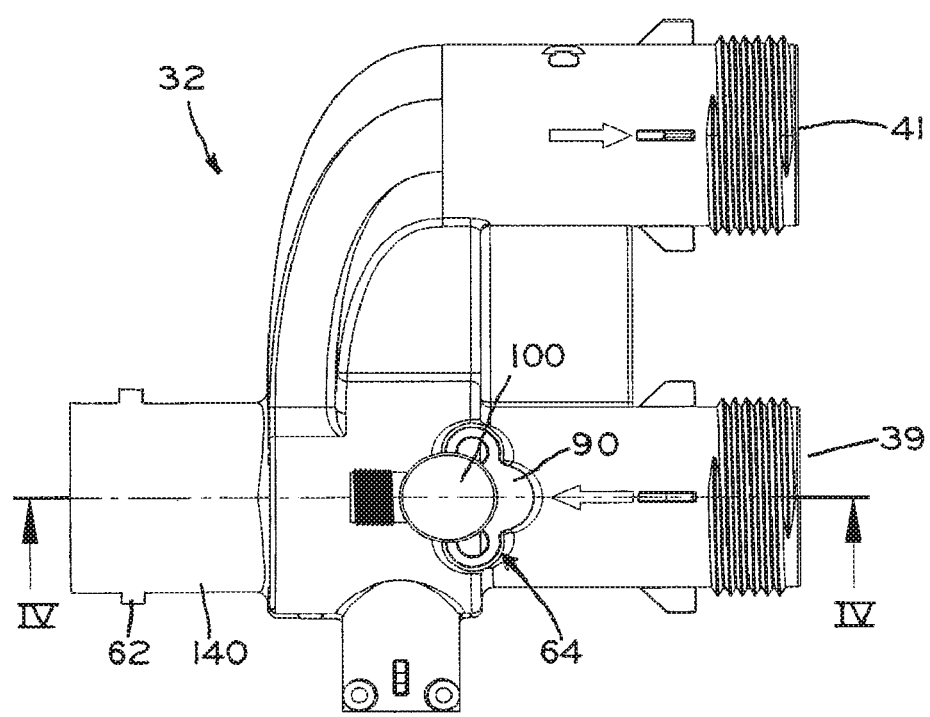
FIG. 3 is a top plan view of the valve arrangement shown in FIG. 1.

Valve arrangement 432 includes inlet 439 and outlet 441, and operates to distribute fluid flowing into inlet 439 selectively to outlet 441, reservoir 34, and drain 453 in similar fashion to valve arrangement 32 shown in FIGS. 1-3 and described in detail above. However, valve bore 446 includes valve seats between the respective ports 450, 452, 454, and 456 which define a conical seating area corresponding to the conical arrangement of valve sealing portion 482 of seal assembly 460. Thus, both valve bore 446 and valve sealing portion 482 of seal 60 define taper angle $\theta$, which in an exemplary embodiment may be as little as 0.25° or as much as 3°, such as about 1.5° in certain exemplary embodiments. Seal assembly 460 is received in valve bore 446 as illustrated in FIG. 12, valve sealing portion 482 is securely seated against bore 446, such that the portions of valve sealing portion between respective annularly arranged sets of flow apertures 486 form outer sealing surfaces between respective neighboring ports 450, 452, 454, 456. Due to the conical shape of the outer surface of sealing portion 482, each respective sealing surface defines a larger diameter as the surfaces progress away from the terminal axial end of sealing portion 482. At the same time, seal seating portion 484 of seal 460 is received within a correspondingly cylindrically shaped portion of bore 446.

Referring back to FIG. 11, an exemplary embodiment of seal 460 includes tool slots 485 formed around an inner periphery of seal seating portion 484 near an axial end of seal 460. At the outer surface of seal seating portion 484, one or more (e.g., such as two as shown) dislodging cams 487 may be provided to align with and be received within indentations formed by cam surfaces 489 formed in the axial end wall of valve bore tube 540. To install seal assembly 460 into valve bore 446, seal 460 is simply axially inserted into valve bore 446 and pushed until dislodging cams 487 seat within the indentation of cam surfaces 489. In this position, the outer surface of valve sealing portion 482 is securely urged into a fluidly sealed contact with the adjacent conical inner surface of valve bore 446 between ports 450, 452, 454, 456.

To remove seal 460 from valve 446, seal 460 is axially withdrawn from valve bore tube 540. In order to facilitate this axial withdrawal and dislodge the fluid type seating of valve sealing portion 482 from valve bore 446, a splined tool sized and shaped to fit tool slots 485 may be inserted therein, and torque may be applied to seal 460 via the tool to rotate dislodging cams 487 into contact with respective ramped cam surfaces 489 formed in valve bore tube 540, which in turn urges seal 460 axially outwardly. Once the sealing engagement between valve sealing portion 482 and valve 446 is broken, seal 460 may be easily axially withdrawn from valve bore tube 540.

Unlike seal assembly 60 shown in FIG. 5 and described in detail above, seal 460 does not include any separate seals disposed at the inner bore thereof. Instead, seals 481, which may be o-rings, are received within correspondingly formed grooves formed in piston 448 as illustrated in FIGS. 11 and 12. Seals 481 form fluid tight seal with the inner sealing surfaces formed between respective annular sets of fluid apertures. More particularly, valve sealing portion 482 has a cylindrical inner surface, such that when piston 448 is positioned so that seals 481 are respectively disposed between sets of annularly arranged apertures 486, fluid is prevented from flowing past seals 481 either into or out of annular recess 447, except through the aligned ports 450, 452, 454, or 456, as described in detail above with respect to piston 48.

Figure 13A:
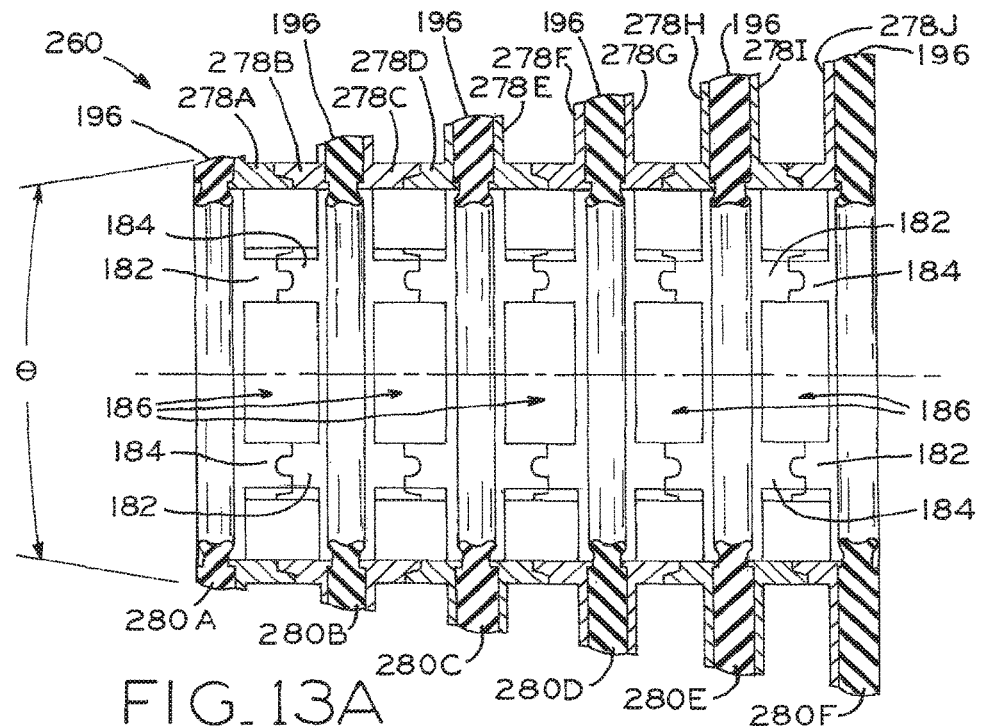
FIG. 13A is a side elevation, cross-section view of an alternative seal arrangement made in accordance with the present disclosure.

Turning now to FIG. 13A, an alternative seal assembly 260 is shown in section. Seal 260 is similar to seal 60 shown in FIGS. 5 and 6 and described above, and structures of seal 260 have corresponding reference numerals to seal 60, except with 200 added thereto. However, seal 260 provides a cone shaped stack of seals 280A-280F and spacers 278A-278J to create a unitary, one-piece assembly 260 whose outside diameter grows progressively larger from one end to the other, rather than the constant-outer-diameter seal assembly 60 which has a constant outside diameter for use in a substantially cylindrical valve bore 46.

Similar to seal 60, inner seal portions 198 form a substantially cylindrical inner profile adapted to sealingly engage piston 48 as described above with respect to seal 60. Outer surfaces 196 of seals 280A-280F, on the other hand, define progressively larger outer diameters as illustrated, such that seal assembly 260 defines a generally conical outer shape which allows assembly 260 to be inserted into a correspondingly cone shaped bore 446 of valve arrangement 432 without resistance until it reaches the final few millimeters to axial travel. Thus, similar to seal 460, outer surfaces 196 cooperate to define taper angle Θ, which may be between 0.25 degrees and 3 degrees as noted above. This allows seal assembly 260 to be inserted into the conical valve bore without undue stresses on any of seals 280A-280F since the seals will pass the adjacent valve ports with no contact.

The inner portion of each of spacers 278A-278J are the same as spacers 178, with respectively interfitting and interlocking outer and inner protrusions 182, 184 cooperating to define flow apertures 186.

During some installations, only one seal 280A-280F will engage the valve bore at a time as seal assembly 260 is inserted therein. Spacing of seals 280A-280F and adjacent ports of the valve bore can be such that seal 280A with the smallest diameter is engaged by the valve bore first, then compression of seal 280A causes axial translation of the next smallest seal 280B which then touches the valve bore. Compression of seal 280B then allows the larger diameter seal 280C to engage, and so on until all seals 280A-280J are engaged. This allows insertion and removal of the seal assembly 260 with little force and minimal risk to the integrity of seals 280A-280J.

Figure 13B:
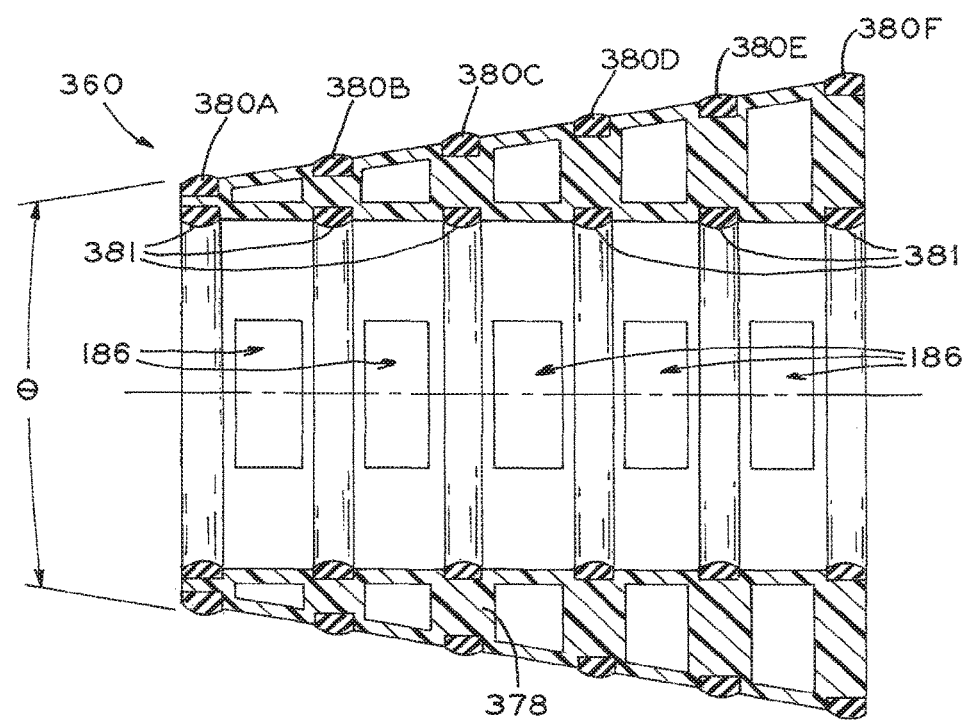
FIG. 13B, is a side elevation, cross-section view of another alternative seal arrangement made in accordance with the present disclosure.

Turning now to FIG. 13B, yet another alternative embodiment of a seal assembly 360 is shown in section. Like seal 260, seal 360 is similar to seal 60 shown in FIGS. 5 and 6 and described above, and structures of seal 360 have corresponding reference numerals to seal 60, except with 300 added thereto. However, seal 360 is also cone-shaped but replaces spacers 278A-278J with a single, unitary body 378 made of a monolithically formed single piece of material, such as plastic or metal. Outer seals 380A-380F define progressively larger outside diameters and are inset into the material of body 378, while a separate set of inner seals 381 sharing a common inner diameter are provided at the inner bore to engage with piston 48. Thus, similar to seal 460, outer seals 380A-380F cooperate to define taper angle Θ, which may be between 0.25 degrees and 3 degrees as noted above.

Seal assembly provides sets of flow apertures 186, axially spaced from one another at regular intervals for fluid flow through the various sets of flow apertures 186 from valve ports (e.g., ports similar to ports 50, 52, 54, 56 described above except in a cone-shaped valve bore). Neighboring pairs of seals 380A-380F and 381 flank each one of the sets of flow apertures 186, as illustrated in FIG. 13B.

Seals 380A-380J and 381 can be an integral part of body 378, can be over-molded thereto, or can be formed from o-rings fitted into correspondingly formed in recessed grooves formed in body 378 as shown. As an alternative to inner seals 381, correspondingly formed seals may be attached to piston 48 within grooves, as over-molded elastomeric material, or as seal ring subassemblies gripped between sections of the piston that are be threaded together.

Seal assembly 360 allows easy assembly and minimizes seal damage during insertion and extraction in a cone shaped valve bore. The cone shaped sleeve can be easily inserted into a cone shaped valve body without resistance until fully inserted, similar to cone-shaped seal assembly 260 described above.

The seal assemblies described above can be inserted all at once, rather than by installing a single seal and/or spacer at a time into a valve bore. No special tools are required for seal assemblies 60, 260 or 360, but rather can simply be installed by hand into the corresponding valve bore. Individual seals and spacers cannot fall out of corresponding valve bores or shift individually within the bores.

The seal assemblies described above can also protect the seals themselves from damage upon installation and removal, as noted above. By providing such protection, the function and longevity of the seal/valve arrangement is enhanced while maintaining the potential for tight seal/valve bore tolerances while ensuring full engagement and compression during sealing for a liquid-tight seal that is not too tight. Thus, the seals are compressed enough to properly engage the cylindrical bore while being prevented from over-compression that might otherwise complicate insertion into the corresponding valve bore.

2. Venturi Valve Cleaner

As noted above, water softener system 30 includes venturi cleaner assembly 64, illustrated in detail in FIGS. 14-17. Venturi cleaner assembly 64 is disposed above and in fluid communication with venturi valve 74, as shown in FIG. 4, which provides suction during fluid flow therethrough to draw/educt a fluid (e.g., regenerant, sanitizer, or chemical cleaner) into the system via brine valve assembly 66, as shown in FIG. 4. Although brine is a common regenerant that may be used in water softener systems such as water softener 30, other regenerants such as chlorine or potassium permanganate solution may also be used.

Suction is created when water is passed through venturi valve 74, which includes inlet nozzle 86 and outlet constriction or throat 88. The connection point for brine valve assembly 66 intersects the fluid flow path between nozzle 86 and throat 88, such that the low pressure created by venturi valve 74 draws regenerant through brine valve assembly 66 and into valve arrangement 32. However, throat 88 of venturi valve 74 may collect solid material from the fluid flowing through valve 74, such as iron, manganese, particulates leading to turbidity, and other contaminants, and may eventually become plugged with such material, thereby preventing flow through valve 74. Without such fluid flow, water softener 30 may be rendered inoperable until the deposit is removed from valve 74.

Figure 15:
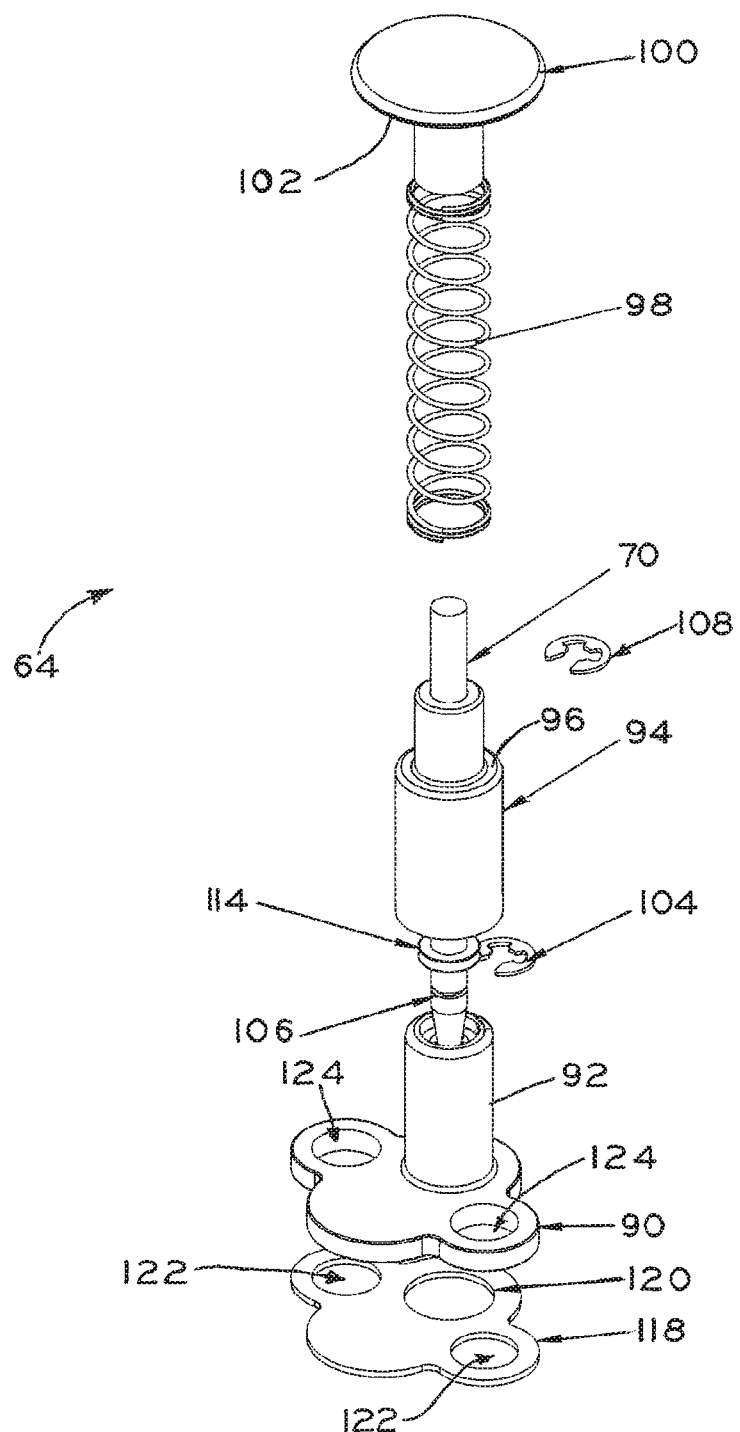
FIG. 15 is an exploded, perspective view of the venturi cleaner assembly shown in FIG. 14.
Figure 16:
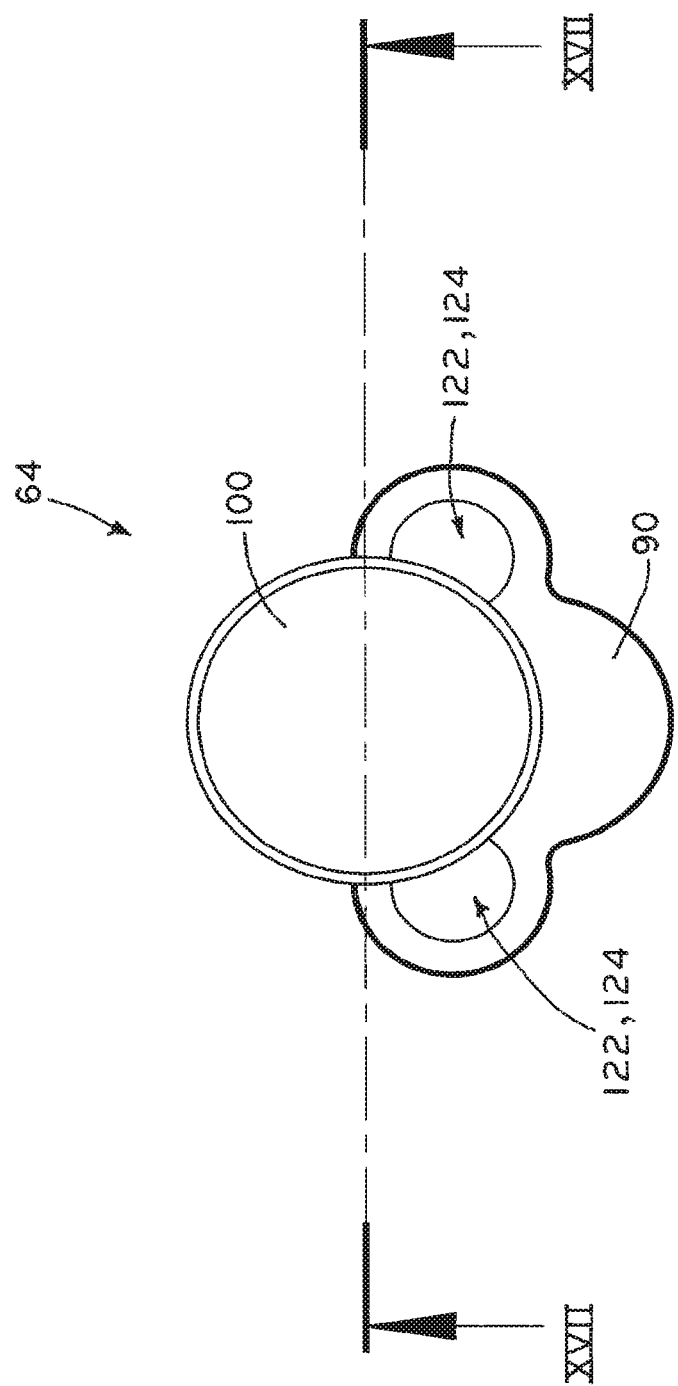
FIG. 16 is a top plan view of the venturi cleaner assembly shown in FIG. 14.
Figure 17:
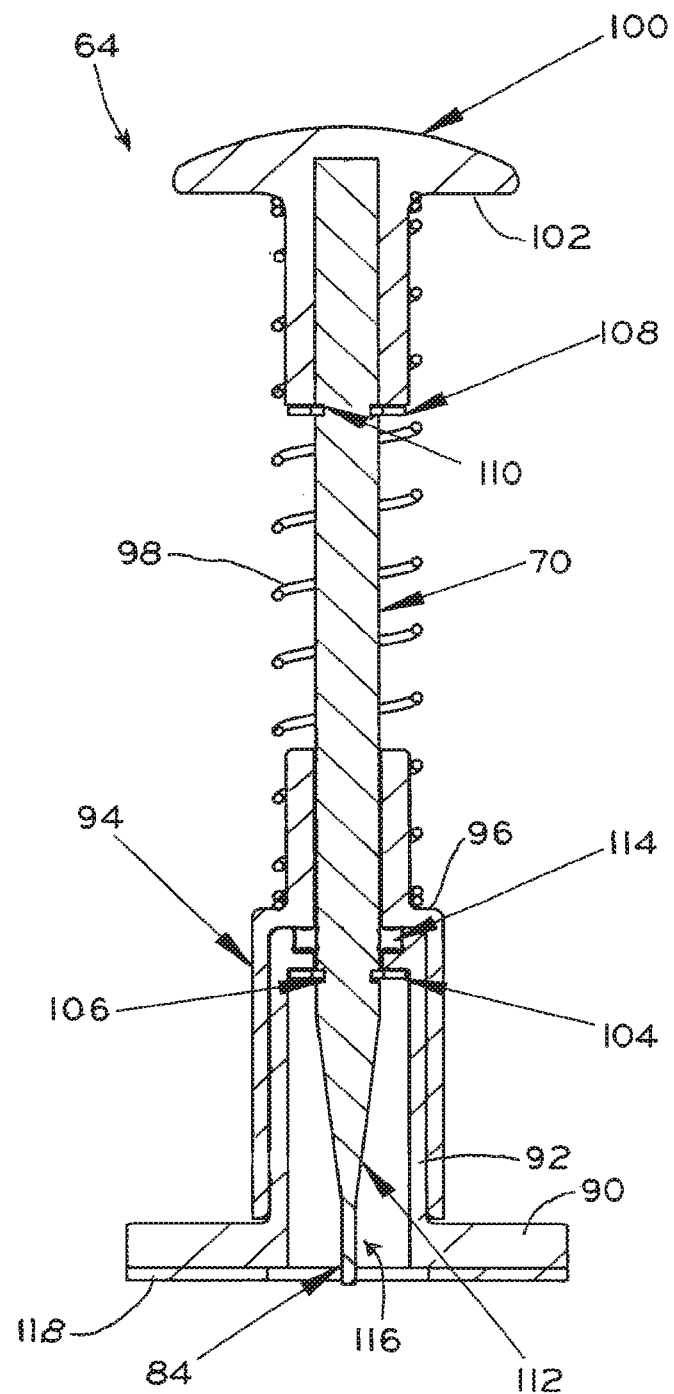
FIG. 17 is a cross-section side, elevation view of the venturi cleaner assembly shown in FIG. 14, taken along the line XVII-XVII of FIG. 16.

Venturi cleaner assembly 64 is mounted above venturi valve 74, and includes venturi plunger 70 axially aligned with venturi valve 74. Venturi plunger 70 may be manually or motor driven downwardly so that deblocking tip 84 is selectively axially advanced to protrude below a mounting surface of base 90, through nozzle 86 and into throat 88 as needed to prevent a buildup of contaminants from plugging throat 88 of venturi, or to dislodge any debris that may already have caused such plugging. Turning to FIG. 14, venturi cleaner assembly 64 includes base 90 adapted to mount to valve arrangement 32, and including an upwardly extending stanchion 92 which receives and guides plunger 70 along its axial path. Sleeve 94 is positioned over stanchion 92, as best shown in FIGS. 15 and 17, and provides further guidance and radial constraint for plunger 70. Sleeve 94 also provides shoulder 96 upon which compression spring 98 rests. Spring 98 extends axially upwardly from shoulder 96, coiling around plunger 70 and abutting shoulder 102 of handle 100.

As shown best in FIG. 17, upward travel of plunger 70 is limited by snap ring 104, which is axially fixed within a corresponding groove 106 and abuts an upper surface of stanchion 92 as shown. An upper snap ring 108 is also contained within groove 110 to provide a bearing surface against which handle 100 urges plunger 70 downwardly against the biasing force of spring 98 when handle 100 is depressed by the user of venturi cleaner assembly 64, as further described below.

The distal portion of plunger 70 includes tapered end 112 spanning the axial distance between the substantially cylindrical shaft of plunger 70 and the substantially cylindrical but smaller-diameter deblocking tip 84. The cylindrical shaft of plunger 70 above tapered end 112 engages gasket 114, which creates a fluid-tight seal between plunger 70, stanchion 92 and sleeve 94 to prevent any fluid contained within cavity 116 of stanchion 92 from leaking outwardly through venturi cleaner assembly 64. Similarly, a lower gasket 118 is provided between base 90 and the adjacent mounting surface on valve arrangement 32 to prevent any leakage at the junction therebetween. Central aperture 120 (FIG. 15) is provided in gasket 118 to allow plunger 70 to protrude therethrough during actuation, while mounting apertures 122 align with correspondingly formed mounting apertures 124 in base 90 to receive fasteners for mounting venturi cleaner assembly 64 to valve arrangement 32 (as shown in FIG. 1).

In use, handle 100 is depressed against the biasing force of spring 98 so that deblocking tip 84 is moved axially downwardly and into the constricted bore defined by throat 88 of venturi valve 74, as shown in FIG. 4. In an exemplary embodiment, deblocking tip 84 is sized just slightly smaller than the size of the bore in throat 88, such that any deposited solid materials on the walls of throat 88 are dislodged and scraped away by deblocking tip 84. In an exemplary embodiment, the total clearance between deblocking tip 84 and throat 88 is between −0.02 mm (that is to say, an interference fit between deblocking tip 84 and throat 88) and 0.05 mm. In one particular exemplary embodiment, such clearance is about 0.02 mm. When pressure on handle 100 is released, plunger 70 advanced upwardly to its disengaged position under the biasing force of spring 98, which in turn withdraws deblocking tip 84 from throat 88. Fluid flowing through venturi valve 74 is then allowed to flush away any dislodged solid material downstream.

Thus, providing venturi cleaner assembly 64 as part of water softener 30 allows a user to free venturi valve 74 of precipitated iron, particulates leading to turbidity or other contaminants by simply pushing plunger 70 downwardly such that deblocking tip traverses nozzle 86 and throat 88 of venturi valve 74. In the illustrated embodiment of FIGS. 4 and 14-17, plunger 70 is manually pushed as described above. However, it is also contemplated that an automated system may be employed to actuate plunger 70, such as a motor or linear actuator. Whether manually or automatically actuated, venturi cleaner assembly 64 may be operated to clean venturi valve 74 on a regular basis, thereby preventing any clogging of throat 88 and ensuring consistent reliable functioning of water softener system 30.

Further, venturi cleaner assembly 64 can be permanently installed as a fixture of water softener system 30. Rather than taking water softener system 30 out of service and disassembling a portion of system 30 to clean venturi valve 74, venturi cleaner assembly 64 is always available to clean and maintain the fluid flow through valve 74. This avoids any need for a technician to perform traditional cleaning techniques such as soaking a disassembled venturi valve 74 in a cleaning solution, running a stiff wire through nozzle 86 and throat 88, scrubbing with a brush, or replacing venturi valve 74.

3. Quick-Release Control Mechanism

Access to valve bore 46, including seal assembly 60 and valve ports 50, 52, 54, 56, is sometimes required for maintenance and repair. To gain such access, control head 36 is removed and piston 48 withdrawn from valve bore 46.

Water softener 30 includes a quick-disconnect fastening design for attaching and detaching control head 36 from valve arrangement 32. Turning to FIGS. 1 and 2, control head 36 includes back plate 126 to which the components within housing 128 are mounted (including motors 49 and 69, and controller 130). Because the functioning of valve arrangement 32 is sensitive to the position of piston 48 relative to valve ports 50, 52, 54, 56, control head 36 attaches to valve arrangement 32 in a precise, repeatable way that ensures a desired relative positioning between piston 48 and the surrounding structures.

To facilitate ease of assembly and disassembly of control head 36 to valve arrangement 32, quick-release coupling 61 is provided (FIGS. 18A and 18B). Coupling 61 includes threaded bores 132 extending into mounting surface 134, such that mounting surface 134 can be brought into abutting contact with back plate 126 and fasteners can be fed into threaded bores 132 to affix coupling 61 to plate 126. Central bore 136 passes through coupling 132, and allows actuator rod 129 of piston 48 to pass therethrough to operably connect piston 48 to motor 49 as shown in FIG. 4.

As best seen in FIG. 2, piston 48 protrudes axially outwardly from receiver bore 138 formed in coupling 61 while also being spaced radially inwardly therefrom to form an annular gap between and inner wall of receiver bore 138 and the adjacent outer wall of piston 48. This annular gap is sized to receive valve bore tube 140 to couple control head 36 to valve arrangement 32. More particularly, coupler 61 includes a pair of arcuate grooves 142 (FIG. 18B) formed on the inner surface of receiver bore 138. Grooves 142 are sized and configured to receive protrusions 62 formed on the outer surface of valve bore tube 140. Upon assembly, insertion portions 144 of grooves 142 are aligned with protrusions 62, then control head 36 is advanced so that valve bore tube 140 is received into receiver bore 138. When protrusions 62 are fully received into insertion portions 144, control head 36 is rotated about one quarter turn, which advances protrusions 62 through grooves 142 and into detent areas 146 at the end of each of grooves 142. It is also contemplated, however, that the arcuate extent (i.e., length) of grooves 142 could be extended in order to provide for a greater rotation of control head 36 between the initially-engaged and fully-received states. In some cases, this greater rotation may be up to one full 360-degree turn of control head 36 relative to valve arrangement 32.

To inhibit loosening of control head 36 from the fully installed configuration, detent areas 146 are provided at the arcuate ends of grooves 142 (i.e., opposite insertion portions 144). Detent areas allow some radial expansion of compressed material of and around protrusions 62 to provide a "locked" configuration. The tolerances of grooves 142 relative to valve bore tube 140 and protrusions 62 causes enough material deformation during assembly that a considerable, deliberate force is needed to rotate control head 36 back out of detent areas 146.

The attachment mechanism provided by coupling 62 and valve bore tube 140 allows securement of control head 36 to the valve arrangement 32 without the use of tools, while also facilitating a firm and reliable fixation when connected. Further, connection and disconnection of control head 36 and valve arrangement 32 can be accomplished quickly with only about one-quarter.

Although the male portion (i.e., valve bore tube 140) of the connection mechanism is shown as being a part of valve arrangement 32 and the corresponding female portion (i.e., receiver bore 138) is part of coupler 61 attached to control head 36, it is contemplated that this arrangement can be reversed while achieving a similar effect. That is, grooves 142 can be formed on a structure attached to valve arrangement 32, and protrusions 62 can be formed on control head 36.

Figure 19:
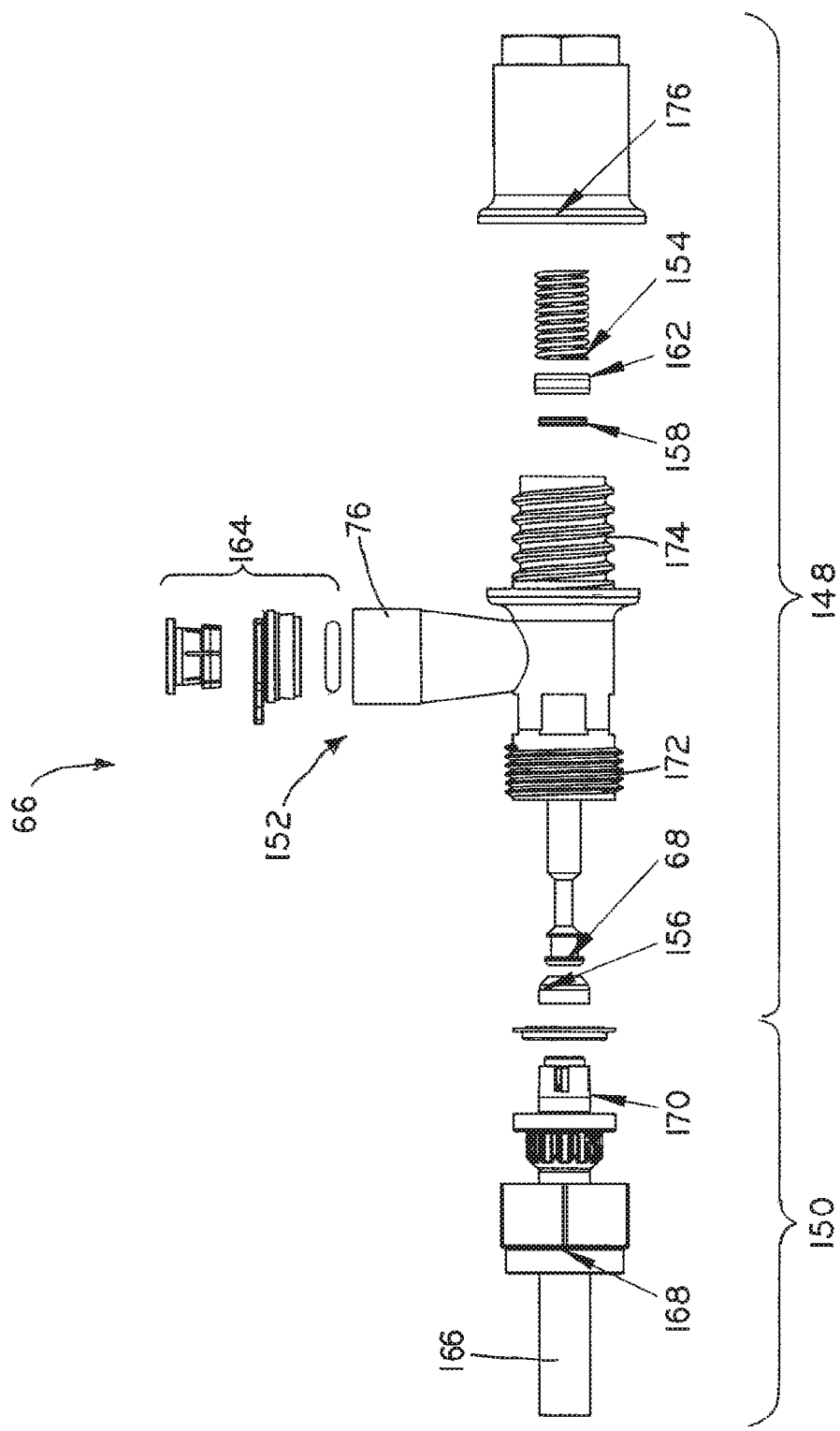
FIG. 19 is a side, elevation exploded view of a brine valve assembly.

In the illustrated embodiment, brine valve assembly 66 is also attached to both control head 36 and valve arrangement 32. In order to facilitate disconnection of control head 36, brine valve assembly is also designed to be quickly and easily disengaged. Turning to FIG. 19, brine valve assembly 66 includes control-side components 148 and system-side components 150, which are selectively interconnectable and detachable as described in detail below.

Control-side components include brine valve stem 68, which is received within brine inlet housing 152 as shown in FIG. 4. Valve stem 68 is biased into an engaged (i.e., fluid-blocking) state by spring 154, which draws valve gasket 156 into a valve seat formed in housing 152. Spring 154 is itself captured between C-ring 158, attached to a corresponding groove 160 formed in valve stem 68, and gasket 162 which isolates spring 154 and the other components within control head 36 from fluid flowing through brine valve assembly 66. Additional components 164 providing a collet-type liquid-tight seal for a tube to connect to inlet 76 are also provided as shown in FIG. 19. Housing 152 includes threaded portion 172 for connecting to system-side components 150 as described below, and another threaded portion 174 adapted to threadingly receive nut 176 to connect housing 152 to control head 36 as illustrated in FIG. 4.

System-side components include female threaded connector 168, which is slidably and rotatably engaged with tube 166. Sealing collet 170 is disposed at the end of tube 166, and is sized to be received and selectively expanded within the bore formed in male threaded portion 172 of brine inlet housing 152.

When control head 36 is fully affixed to valve arrangement 32 as shown in FIG. 1 and described in detail above, control-side and system-side components 148, 150 are axially aligned. Threaded connector 168 can then be threadably received upon male threaded portion 172 of housing 152. As threaded connector is tightened, collet 170 expands to sealingly couple the fluid conduit within tube 166 and the adjacent fluid conduit within housing 152. Disconnection can be effected by simply unthreading connector 168.

As illustrated in FIG. 4, gasket 156 of valve stem 68 is disposed within housing 152 between the flow path of inlet 76 and the flow path leading to threaded portion 172 and on to valve arrangement 32 (when control-side and system-side components 148, 150 are connected). Thus, any fluid pressure within inlet 76 need not be relieved before disconnecting control head 36 from valve arrangement 32; rather, valve stem 68 can simply be allowed to be biased to its closed configuration by spring 154, thereby sealing any pressurized fluid in housing 152 between gaskets 156 and 162. Control head 36 can then be disconnected, service performed, and reconnected before reopening valve stem 68 to allow brine to flow through brine valve assembly 66.

4. Regenerant Substrate Monitor

Ion exchange water softeners, such as water softener 30, may require regeneration periodically with salt brine. Sodium chloride or potassium chloride in pellet or rock form may be stored in substrate reservoir 34, which may be a plastic or fiber glass vessel in some exemplary embodiments. Water is added to reservoir 34 during one of the cycles provided by ports 50, 52, 54, 56 of valve arrangement 32 cooperating with piston 48 as described above. Each time water softener 30 regenerates salt is consumed from reservoir 34. The amount used during each regeneration cycle varies by the relative size of water softener 30 and elective programming.

Figure 20:
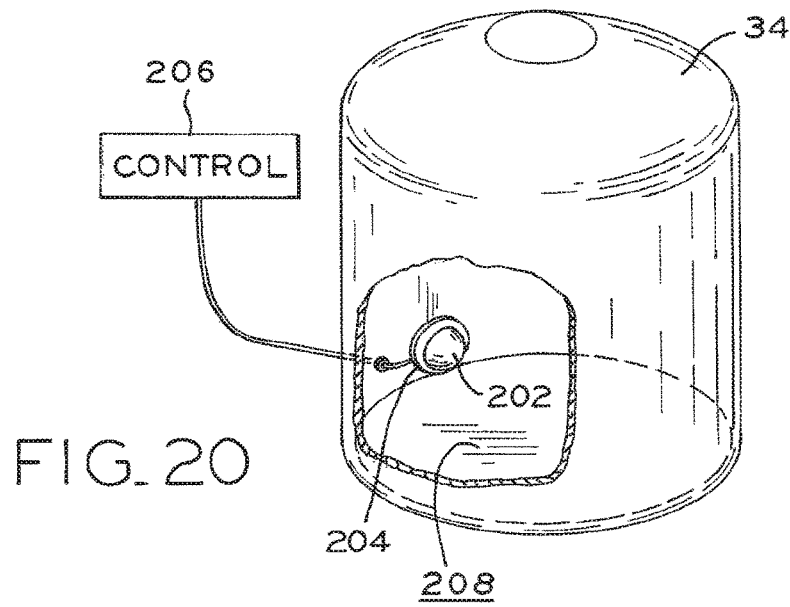
FIG. 20 is a perspective view of a substrate monitor made in accordance with the present disclosure.

As shown in FIG. 20, substrate reservoir 34 of water softener 30 may optionally include a pressure actuated switch or button 202 housed in a waterproof enclosure 204. Button 202 has a domed, convex outer shape in the form of a "pillow" and is located at or near the bottom of the side wall of substrate reservoir 34. This domed shape allows button 202 to be depressed, and therefore actuated, when pushed from any angle. Thus, salt or other substrate that is not engaging the entirety of button 202, such as only on the bottom half or third of button 202, will still act to depress button 202 against the spring bias which urges button 202 into the non-actuated position. When the salt drops entirely or almost entirely below the domed outer surface of button 202, the spring is allowed to push button outwardly and a circuit is completed. This circuit sends a signal to controller 206, which in turn may be programmed to activate an indicator (e.g., a light or audible alarm) which may be mounted to wireless remote, on control head 36 or valve arrangement 32, or any other suitable location where a user will be alerted to refill substrate reservoir 34. In an exemplary embodiment, button 202 is mounted far enough above the bottom surface 208 of reservoir 34 to allow operation of water softener 30 for a period of time after controller 206 activates the alert, so that a user will have sufficient time to refill before interruption of the supply of substrate occurs.

Provision of a domed button 202, which reliably alerts when the salt or substrate in reservoir 34 is low, ensures that such substrate will remain continuously available to water softener 30 by urging users to refill reservoir 34 when necessary. This continuous availability, in turn, ensures proper regeneration of the brine and proper softening of the water passing through valve arrangement 32. This properly softened water protects steam boilers and other water using equipment, and in other applications where water quality is or particular importance such as hospitals, laundries, car washes, window manufactures, nursing homes, pretreatment for reverse osmosis membranes, commercial dishwashers, etc.

5. Integral Audio Instruction System

Figure 21:
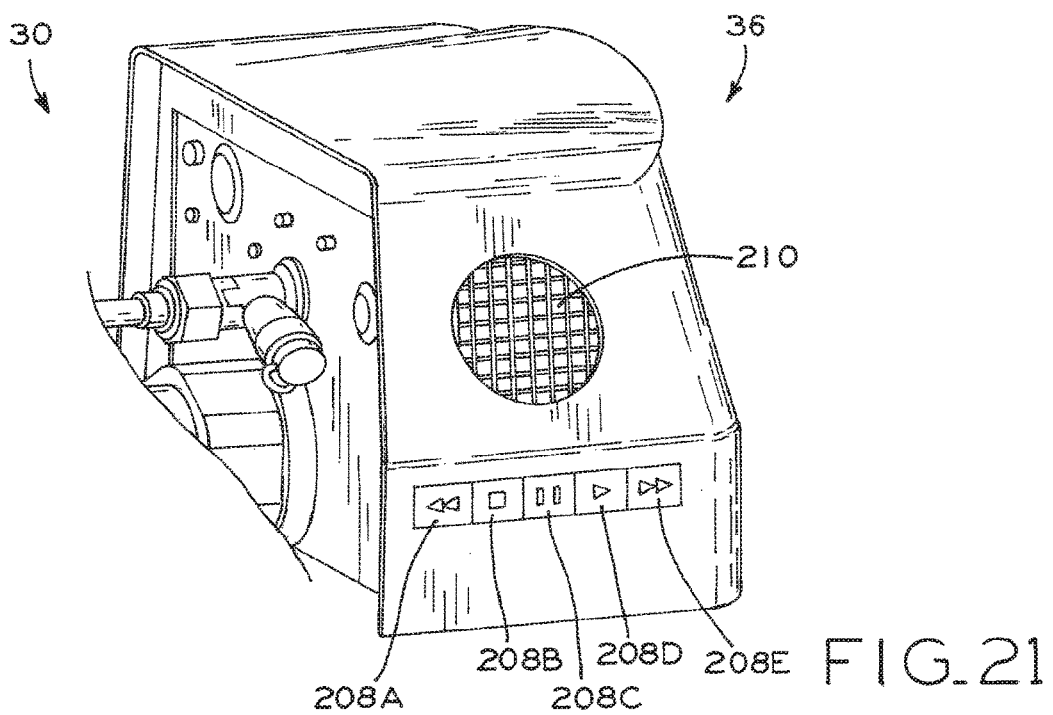
FIG. 21 is a perspective view of an audio instruction system made in accordance with the present disclosure.

Turning now to FIG. 21, water softener 30 may include an audio instruction system to provide a user with instruction on the installation, use and/or maintenance of water softener 30. In an exemplary embodiment, speaker 210 is provided within control head 36, which in turn may be connected to control 206 (FIG. 20) contained within control head 36 or mounted externally. A set of control buttons 208A-208E in the control valve may also be connected to controller 206, and provide signals to prompt controller 206 to play instructions through speaker 210, pause or stop instructions, fast-forward or rewind instructions, for example. Control 206 may be separate from, or a part of, controller 130 discussed above.

Such instructions may also be automatically provided to the user upon installation, such as by providing a reset switch connected to controller 206 that is activated when control head 36 is first installed upon valve arrangement 32 (as described in detail above).

Water treatment device 30 may also be equipped with an electronic timing device consisting of a circuit board with display screen operably connected to push buttons 208A-208E. During the start-up of water treatment device 30 buttons 208A-208E can be pushed to set the time of day and various other system functions. Speaker 210, which may be a piezo type speaker, may be wired to controller 206 to automatically initiate an audio script during the normal start-up procedure that lists the most important information required for a proper installation. If the installer wants to repeat the list he can manually press the rewind button 208A to re-initiate the instructions.

The audio system of the present disclosure facilitates correct installation of water softener 30 or other water treatment equipment by users lacking otherwise required knowledge that may be out of the normal range of the typical installer. In addition, the audio instruction system alleviates the potential consequences of written instillation instructions that are not read, while being less time consuming than video instructions. This protects the function and integrity of water softener 30 and protects the safety of the user.

Water softener 30 may include any or all of the above-described features and systems to enhance functionality, efficiency and usability.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A valve arrangement comprising:
a venturi valve having a nozzle portion at an inlet end and a throat at an outlet end, the throat having a constricted flow area with respect to said nozzle portion; and
a venturi cleaner assembly comprising:
a base including a mounting surface adapted to mount to the valve arrangement; and
a plunger received in said base, said venturi cleaner assembly mounted in axial alignment with said venturi valve, said plunger including a deblocking tip having a tip diameter sized such that the deblocking tip is axially moveable to selectively protrude past said mounting surface and into said throat of said venturi valve, said plunger further including a shaft with a shaft diameter larger than the tip diameter and sized to abut said throat of said venturi valve when said deblocking tip is received in said throat; and
a biasing element urging said deblocking tip of said plunger towards said inlet end and out of engagement with said throat of said venturi valve.

2. The valve arrangement of claim 1, wherein said base includes a stanchion extending upwardly from said base, said venturi cleaner assembly further including a sleeve received on said stanchion and engaging said plunger to provide guidance and radial constraint for said axial movement of said plunger.

3. The valve arrangement of claim 2, wherein said venturi cleaner assembly further includes a gasket disposed between said plunger, said stanchion and said sleeve to provide a fluid-tight seal therebetween.

4. The valve arrangement of claim 3, further comprising a spring coiled around said plunger, said spring extending between a first shoulder formed on said sleeve and a second shoulder formed on a handle mounted to said plunger.

5. The valve arrangement of claim 1, wherein said deblocking tip is sized to have a clearance between −0.02 mm and 0.05 mm with respect to said throat of said venturi valve.

6. The valve arrangement of claim 1, wherein said deblocking tip is sized to define an interference fit with said throat of said venturi valve.

7. The valve arrangement of claim 1, wherein said deblocking tip is sized to have a clearance of about 0.02 mm with respect to said throat of said venturi valve.

8. The valve arrangement of claim 1, wherein said plunger includes a tapered portion spanning an axial distance between said shaft and said deblocking tip.

9. The valve arrangement of claim 8, wherein said tapered portion is configured to engage said throat of said venturi valve when said deblocking tip is received in said throat.

10. The valve arrangement of claim 9, wherein:
said shaft of said plunger is substantially cylindrical above said tapered portion; and
said deblocking tip of said plunger is substantially cylindrical below said tapered portion.

11. The valve arrangement of claim 1, further comprising:
a snap ring contained by a groove formed on said plunger, said snap ring positioned to abut a surface of said base when said deblocking tip is fully disengaged from said throat of said venturi valve, whereby said snap ring limits travel of said plunger along a disengagement direction.

12. The valve arrangement of claim 1, further including a gasket provided between said base and said mounting surface.

13. The valve arrangement of claim 1, wherein:
any deposited material on a wall of said throat is dislodged and scraped away by said plunger when said deblocking tip of said plunger is engaged with said throat of said venturi valve; and
any dislodged deposited materials within said throat of said venturi valve are allowed to be flushed away when said deblocking tip of said plunger is withdrawn from said throat of said venturi valve.

14. A valve arrangement comprising:
a venturi valve having a nozzle portion at an inlet end and a throat at an outlet end, the throat having a constricted flow area with respect to said nozzle portion; and
a venturi cleaner assembly comprising:
a base including a mounting surface adapted to mount to the valve arrangement; and
a plunger received in said base, said venturi cleaner assembly mounted in axial alignment with said venturi valve, said plunger including a deblocking tip that is axially moveable to selectively protrude past said mounting surface and into said throat of said venturi valve, said deblocking tip sized to have a clearance between −0.02 mm and 0.05 mm with respect to said throat of said venturi valve; and
a biasing element urging said deblocking tip of said plunger towards said inlet end and out of engagement with said throat of said venturi valve.

* * * * *